United States Patent
Nakamura

(10) Patent No.: US 12,502,820 B2
(45) Date of Patent: Dec. 23, 2025

(54) RESIN CONTAINER MANUFACTURING METHOD AND RESIN CONTAINER MANUFACTURING APPARATUS

(71) Applicant: Takayuki Nakamura, Kanagawa (JP)

(72) Inventor: Takayuki Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 207 days.

(21) Appl. No.: 18/132,443

(22) Filed: Apr. 10, 2023

(65) Prior Publication Data

US 2023/0321890 A1    Oct. 12, 2023

(30) Foreign Application Priority Data

Apr. 11, 2022  (JP) .................. 2022-065075
Feb. 1, 2023   (JP) .................. 2023-013694

(51) Int. Cl.
| | |
|---|---|
| *B29C 49/42* | (2006.01) |
| *B29K 67/00* | (2006.01) |
| *B29L 31/00* | (2006.01) |

(52) U.S. Cl.
CPC .. *B29C 49/42412* (2022.05); *B29K 2067/003* (2013.01); *B29L 2031/7158* (2013.01)

(58) Field of Classification Search
CPC .......................... B29C 49/42; B29C 49/42412
See application file for complete search history.

(56) References Cited

U.S. PATENT DOCUMENTS

| | | | | |
|---|---|---|---|---|
| 3,770,860 | A * | 11/1973 | Amberg et al. | B29C 49/22 264/553 |
| 4,323,411 | A * | 4/1982 | Uhlig | B29C 49/24 425/530 |
| 2012/0086143 | A1* | 4/2012 | Huettner | B29C 49/42412 425/135 |
| 2013/0140745 | A1* | 6/2013 | Preckel | B29C 49/42073 264/503 |
| 2015/0203236 | A1* | 7/2015 | Etesse | B65D 1/023 206/459.5 |
| 2015/0352772 | A1* | 12/2015 | Feuilloley | B29D 22/003 425/135 |
| 2017/0355125 | A1* | 12/2017 | Miyawaki | B29C 49/071 |
| 2019/0070771 | A1* | 3/2019 | Feuilloley | B29C 49/6436 |
| 2022/0097414 | A1* | 3/2022 | Hirayama | B65B 61/26 |
| 2022/0118553 | A1* | 4/2022 | Miyanishi | B23K 26/0821 |
| 2022/0266392 | A1 | 8/2022 | Hirayama et al. | |

(Continued)

FOREIGN PATENT DOCUMENTS

| | | |
|---|---|---|
| EP | 3 411 239 B1 | 3/2021 |
| JP | 2001-310374 | 11/2001 |

(Continued)

OTHER PUBLICATIONS

U.S. Appl. No. 17/936,071, filed Sep. 28, 2022, Hiroyuki Tanabe, et al.

(Continued)

*Primary Examiner* — Andrew D Graham
(74) *Attorney, Agent, or Firm* — XSENSUS LLP

(57) ABSTRACT

A resin container manufacturing method includes: forming a first pattern on a preform of a resin container; and forming a second pattern on the preform based on a position of the first pattern on the preform.

20 Claims, 16 Drawing Sheets

(56) References Cited

U.S. PATENT DOCUMENTS

| | | | |
|---|---|---|---|
| 2022/0276042 A1 | 9/2022 | Fujita et al. | |
| 2022/0305812 A1 | 9/2022 | Funahashi et al. | |
| 2022/0339847 A1* | 10/2022 | Lester | B29C 49/04 |
| 2022/0388324 A1 | 12/2022 | Yoshii et al. | |
| 2022/0388724 A1 | 12/2022 | Serizawa et al. | |
| 2022/0388744 A1 | 12/2022 | Funahashi | |
| 2022/0410608 A1 | 12/2022 | Hirayama et al. | |
| 2023/0201967 A1* | 6/2023 | Ichikawa | B29C 49/071 264/400 |

FOREIGN PATENT DOCUMENTS

| | | |
|---|---|---|
| JP | 2006-076210 | 3/2006 |
| JP | 2016-120700 A | 7/2016 |
| JP | 2022-035975 | 3/2022 |
| JP | 2022-035976 | 3/2022 |
| JP | 2022-056333 | 4/2022 |
| JP | 2022-057612 | 4/2022 |
| JP | 2022-058127 | 4/2022 |
| JP | 2022-086838 | 6/2022 |
| KR | 10-2021-0130265 A | 10/2021 |
| WO | 2017/133815 A1 | 8/2017 |
| WO | 2021/122712 A1 | 6/2021 |

OTHER PUBLICATIONS

U.S. Appl. No. 18/054,912, filed Nov. 14, 2022, Kazunori Watanabe, et al.
U.S. Appl. No. 18/055,423, filed Nov. 15, 2022, Tetsuya Sonoda, et al.
Extended European Search Report issued Sep. 1, 2023 in European Patent Application No. 23167270.0, 10 pages.

* cited by examiner

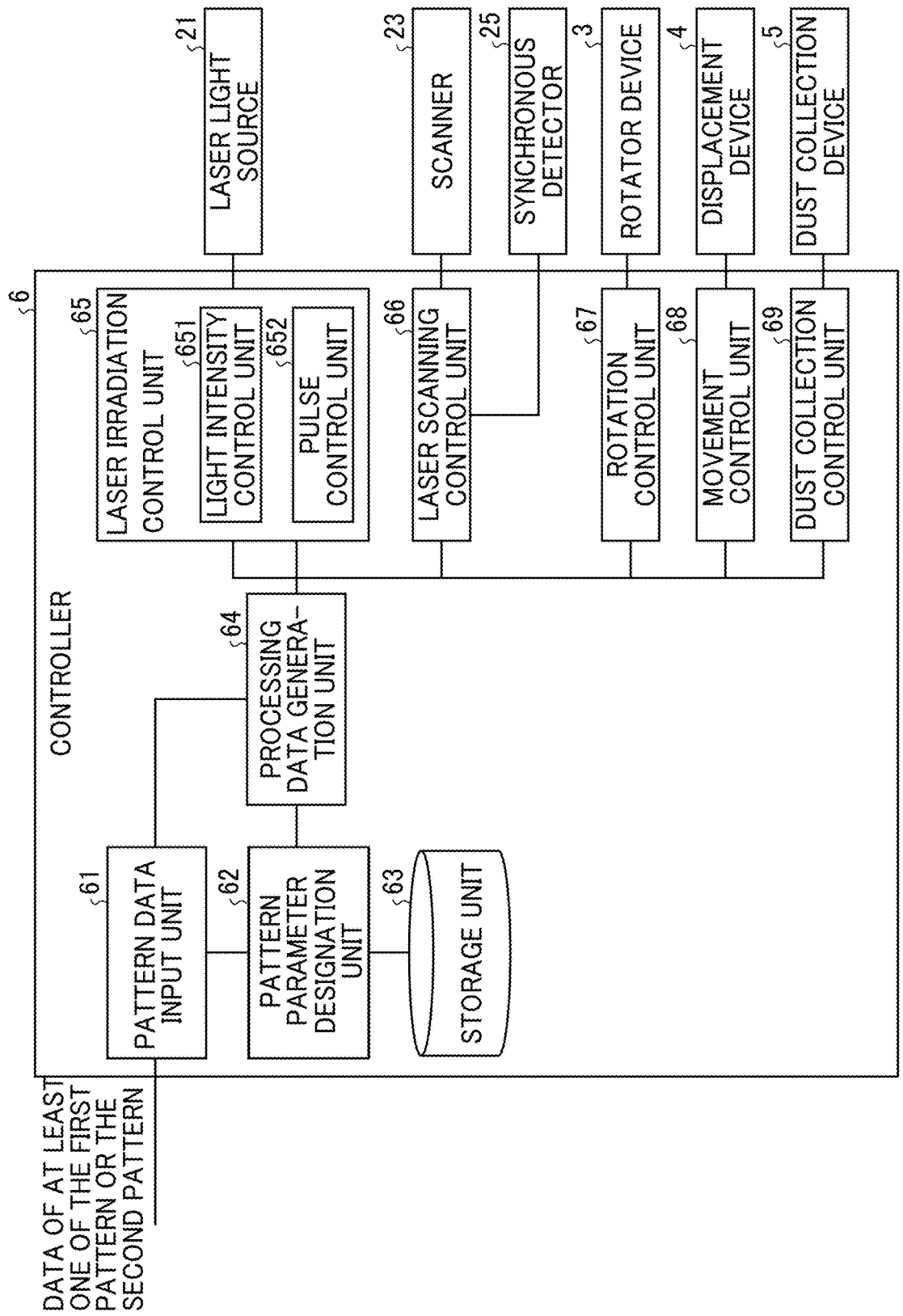

COMPARATIVE EXAMPLE

COMPARATIVE EXAMPLE

RESIN CONTAINER MANUFACTURING METHOD AND RESIN CONTAINER MANUFACTURING APPARATUS

CROSS-REFERENCE TO RELATED APPLICATIONS

This patent application is based on and claims priority pursuant to 35 U.S.C. § 119(a) to Japanese Patent Application No. 2022-065075, filed on Apr. 11, 2022, in the Japan Patent Office, and Japanese Patent Application No. 2023-013694, filed on Feb. 1, 2023, in the Japan Patent Office, the entire disclosures of which are hereby incorporated by reference herein.

BACKGROUND

Technical Field

The present disclosure relates to a resin container manufacturing method and a resin container manufacturing apparatus.

Related Art

A technique for manufacturing a resin container by laser marking on a preform and a preform positioning apparatus are known. In the preform positioning apparatus, a circumferential position of the preform in a mold is determined on the basis of forming an external discontinuity portion to a flange portion or marking by printing.

SUMMARY

A resin container manufacturing method includes: forming a first pattern on a preform of a resin container; and forming a second pattern on the preform based on a position of the first pattern on the preform.

Further, an embodiment of the present disclosure provides a resin container manufacturing method includes: forming a second pattern on a preform of a resin container; and forming a first pattern on the preform based on a position of the second pattern on the preform.

Further, an embodiment of the present disclosure provides a resin container manufacturing apparatus includes: a first pattern forming device to form a first pattern on a preform of a resin container; and a second pattern forming device to form a second pattern on the preform based on a position of the first pattern on the preform.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a block diagram of a functional configuration of a controller according to the embodiment:

Figure 1:
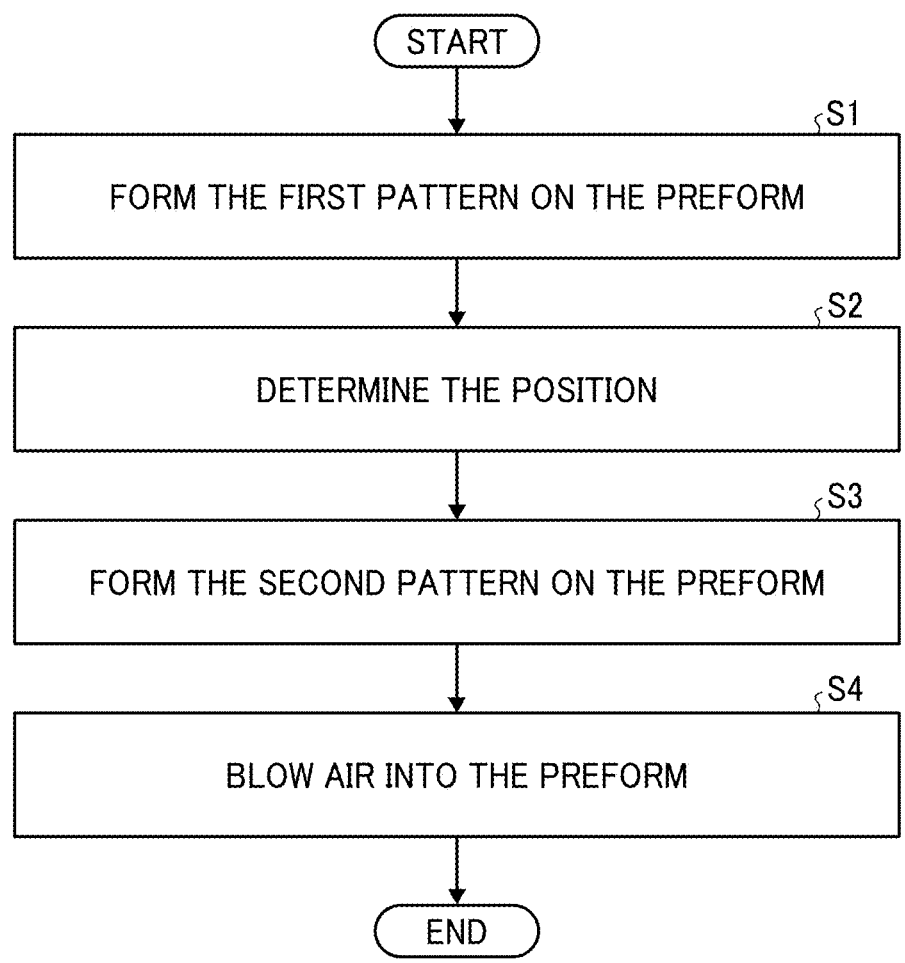
FIG. 1 is a flowchart of a resin container manufacturing method according to the embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

According to embodiments of the present invention, a resin container manufacturing method to manufacture a resin container having a preferable visibility can be provided.

Resin Container Manufacturing Method and Resin Container Manufacturing Apparatus A resin container manufacturing method according to the first embodiment is a resin container manufacturing method by blow molding (blow molding process, a blow molding step, S4) and includes a first pattern forming step (S1) of forming a first pattern on a preform and a second pattern forming step (S3) of forming a second pattern on the preform on the basis of the first pattern, and further may include other steps.

A resin container manufacturing apparatus according to the first embodiments is a resin container manufacturing apparatus by blow molding and includes a first pattern forming device to form a first pattern on a preform, a second pattern forming device to form a second pattern on the preform based on the first pattern, and further may include other devices.

The resin container manufacturing method according to the first embodiment of the present invention can be suitably implemented by the resin container manufacturing apparatus according to the first embodiment of the present invention. The first pattern forming step (S1) can be performed by the first pattern forming device, the second pattern forming step (S3) can be performed by the second pattern forming device, and the other steps can be performed by other devices.

When the preform in which the first pattern and the second pattern are formed on a non-cylindrical resin container having multiple surfaces, and if the second pattern is formed across the two or more surfaces, an intended second pattern is not formed. As a result, the resin container has a poor visibility. The resin container manufacturing method and the resin container manufacturing apparatus according to the first embodiment of the present invention include a first pattern forming step for forming a first pattern on a preform and a second pattern forming step for forming a second pattern on the preform based on the first pattern, and a second pattern for displaying information such as a name and a component is formed on the preform based on the first pattern formed on the preform. Thus, a resin container having preferable visibility can be manufactured even when the preform is molded into a non-cylindrical resin container by blow molding.

Since the first pattern is a simple pattern (e.g., a longitudinal line), the first pattern can be recognized by, for example, a low-cost simple optical device. Such a low-cost simple optical device includes a light emitting element and a light receiving element. Specifically, a light emitting diode (LED) and a photo diode (PD) are used in the device. As a result, it is easy to specify the portion on which the second pattern is formed. Further, because of the presence of the first pattern, the position of the second pattern can be found by recognizing the first pattern by a low-cost simple optical device without using an image processing device to recognize the position of the second pattern (e.g., a camera or a line sensor captures the image, and the image is processed). For example, a low-cost simple optical device includes a light emitting element and a light receiving element. Specifically, a light emitting diode (LED) and a photo diode (PD) are used in the device. As a result, the cost of the device as a whole is reduced.

First Pattern Forming Step and First Pattern Forming Device

The first pattern forming step is a step of forming the first pattern on the preform, and is performed by the first pattern forming device. The first pattern forming device is not particularly limited as long as it can form the first pattern on the preform and can be appropriately selected according to the purpose, and examples thereof include a laser marking device, an inkjet printer, or a metal mold.

Preform

A preform is an intermediate product in the stage before expanding (stretching) the preform and molding the preform into a resin container such as a PET bottle. The volume of the preform is ⅕ to ⅒ of that of a resin container such as a PET bottle. The material, shape, size, structure, or color of the preform are not particularly limited, and can be appropriately selected according to the purpose. The material of the preform is not particularly limited and can be appropriately selected according to the purpose. For example, the material is resin. Examples of the resin of the container body include polyvinyl alcohol (PVA), polybutylene adipate terephthalate (PBAT), polyethylene terephthalate succinate, polyethylene (PE), polypropylene (PP), polyethylene terephthalate (PET), polyvinyl chloride (PVC), polystyrene (PS), polyurethane, epoxy, bio polybutylene succinate (PBS), butylene adipate co-terephthalate (PBAT), polyethylene-starch blend, poly(butylene succinate-co-terephthalate), polylactic acid (PLA), poly(3-hydroxybutyrate-co-3-hydroxyhexanoate) (PHBH), polyhydroxyalkanoate (PHA), Bio-PET 30, Bio-polyamide (PA) 610, 410, and 510, Bio-PA1012 and 10T, Bio-PA 11T, MXD10, Bio polycarbonate, Bio polyurethane, Bio-Polyethylene, Bio-PET100, Bio-PA11, Bio-PA1010. These may be used alone or in combination thereof. Among these resins, biodegradable resins such as polyvinyl alcohol, polybutylene adipate terephthalate, and polyethylene terephthalate succinate are preferable in terms of the environmental load.

The shape of the preform is not particularly limited and can be appropriately selected according to the purpose, and examples thereof include a bottle shape, a cylindrical shape, a quadrangular prism shape as a non-cylindrical shape, a polygonal columnar shape, or an elliptical columnar shape. Among these shapes, the bottle shape is preferable. The bottle-shape preform has a finish portion (i.e., a spout, a mouth, a mouth portion, or an opening), a shoulder portion integrated with the finish portion, a sidewall portion integrated with the shoulder portion, and a bottom portion integrated with the sidewall portion. The size of the preform is not particularly limited and can be appropriately selected in accordance with the size of the resin container. The structure of the preform is not particularly limited and can be appropriately selected according to the purpose, and may be, for example, a single-layer structure or a multi-layer structure.

Examples of the color of the preform include colorless and transparent, colored and transparent, and colored and opaque. Among these shapes, the colorless and transparent is preferable.

The method of molding the preform is not particularly limited and can be appropriately selected according to the purpose. For example, the preform can be molded by an injection molding method.

The blow molding is not particularly limited and can be appropriately selected according to the purpose. For example, a preform is set in a blow molding apparatus, and the preform is heated. Next, an extension rod (stretching rod) is inserted into the heated preform, compressed air is supplied from the extension rod inserted, and the extension rod is extended. Thus, the preform is stretched in the longitudinal direction and the transverse direction, and a resin container is molded.

The first pattern is not particularly limited as long as the position of the preform in the circumferential direction is determined with respect to the mold at the time of blow molding (blow molding process, a blow mold step) and can be appropriately selected according to the purpose. Examples of the first pattern include lines, letters, symbols, projections, projections, recesses, or notches.

Second Pattern Forming Step and Second Pattern Forming Device

The second pattern forming step is a step of forming a second pattern on the preform based on the first pattern, and is performed by the second pattern forming device. The second pattern forming device is not particularly limited as long as the second pattern is formed on the preform, and can be appropriately selected according to the purpose. Examples of the second pattern forming pattern include a laser marking device, an inkjet printer, or a mold.

The second pattern is not particularly limited and can be appropriately selected according to the purpose and includes, for example, characters, symbols, graphics, images, or codes. Specific examples of the second pattern include a name, an ingredient, an identification number, a manufacturer name, a date and time of manufacture, a best-before date, a bar code, a QR code (registered trademark), a recycle symbol, or a logo.

Other Steps and Other Devices

Examples of the other steps include a conveying step and a control step. Examples of the other devices include a conveying device (e.g., a conveyor) and a control device (e.g., a controller).

In one embodiment of the present invention, the first pattern forming step and the second pattern forming step are the identical process. For example, the first pattern forming step and the second pattern forming step may be processed at a different time in the same apparatus, or the first pattern forming step and the second pattern forming step are processed at the same time in the same apparatus. According to the present aspect, the positional deviation or displacement between the first pattern and the second pattern can be reduced. Thus, the resin container can be manufactured efficiently at low cost.

In the resin container manufacturing method according to the embodiments, the forming the first pattern and the forming the second pattern are performed in an identical process.

In one embodiment of the present invention, the first pattern is formed in the preform in the vicinity of an opening through which air is blown into the preform. Since the region in the vicinity of the opening through which air is blown into the preform is a region at which the expansion rate (stretch ratio) at the time of blow molding is smaller, if the region is set as a subject of inspection in advance by an appearance inspection apparatus, there is no error in the appearance inspection.

In one embodiment of the present invention, the region in which the first pattern is formed in the preform is a non-deformation region that does not deform when the preform is molded by blow molding. The non-deformation region is a region that is not expanded (stretched) and is not deformed when the preform is molded by blow molding. According to the embodiments, since the non-deformation region is not subject to the appearance inspection after blow molding or after filling the contents into the resin container, the first pattern is not detected as an error in the appearance inspection.

In one embodiment of the present invention, the first pattern is preferably formed by laser marking. Preferably, the second pattern is formed by laser marking. The first pattern may be formed in the mouth portion or the finish portion of the resin container with a shape such as a notch with, for example, a mold. However, to manufacture a new mold or to perform a cutting process for forming the shape such as a notch is additional process, which results in high cost. By contrast, when the first pattern is formed by laser marking, to manufacture a new mold is omitted, and even in the case of a resin container for beverages, the shape of the mouth portion is not changed because only a depth of about several tens μm from the surface of the resin container is processed, so that the low cost of manufacturing is achieved.

In the resin container manufacturing method according to the embodiments, the forming the first pattern forms the first pattern by laser marking.

In the resin container manufacturing method according to the embodiments, the forming the second pattern forms the second pattern by laser marking.

In one embodiment of the present invention, the second pattern is preferably any one of a character, an image, and a graphic. The second pattern includes a name of a manufacturer, a logo, a product name, or a product image related to the contents of the resin container, and is indicated by letters, images, or figures. In addition, letters such as description of contents, composition of ingredients, and precautionary statements accompanying use, eating or drinking is provided.

In one embodiment of the present invention, based on a first pattern formed in the preform, the circumferential position of the preform is determined with respect to the mold in blow molding. A resin container manufacturing method in which the cross-sectional shape of the main body is formed by blow molding as a non-cylindrical shape. In other words, the preform is mold into the resin container having a body having a non-cylindrical shape in the cross section. The second pattern is formed in at least one surface of the main body of the resin container. According to the embodiment, if the positions of the first pattern and the second pattern are fixed, the arrangement of the preform in the circumferential direction can be easily set at a predetermined angle based on the first pattern, so that the second pattern can be appropriately formed and no error occurs in the appearance.

In one embodiment of the present embodiment, a resin container manufacturing method in which the cross-sectional shape of a main body is formed by the blow molding as a non-cylindrical shape. In other words, the preform is mold into the resin container having a body having a non-cylindrical shape in the cross section. The second pattern is formed in at least one surface of the main body of the preform. When the expression below is satisfied, the second pattern can be prevented from extending over multiple surfaces.

$$L-[(a \times \alpha)+(b \times 2)] \geq 0,$$

where a is a length [mm] in a circumferential direction of the second pattern formed on the preform, α is the expansion ratio in the circumferential direction after the second blow molding [%], L is the length [mm] in the width direction of the surface of the resin container after blow molding on which the second pattern is formed, and b is a distance [mm] between the outer peripheral portion of the second pattern and an edge of the closest surface. According to the present embodiment, although the position of the second pattern is displaced from the initial setting due to a slight deviation (displacement) in blow molding, if the distance b between the outer peripheral portion of the second pattern and the edge of the closest surface is set to a certain distance, the second pattern can be formed without covering the edge of the closest surface.

In the resin container manufacturing method according to the embodiments, the preform has a cylindrical shape, and an expression below is satisfied:

$$L-[(a \times \alpha)+(b \times 2)] \geq 0,$$

where a is a length [mm] of the second pattern in a circumferential direction of the preform, a is an expansion ratio [%] of the second pattern in the circumferential direction after the blowing, L is a length [mm] in a width direction of one of the multiple surfaces of the resin container after the blowing, and b is a distance [mm] between an outer peripheral end of the second pattern and one end of the one of the multiple surfaces closest to the outer peripheral end in the width direction.

The resin container manufacturing method according to the second embodiment, the resin container manufacturing method using a blow molding method includes a second pattern forming step of forming a second pattern on the preform and a first pattern forming step of forming a first pattern on the preform based on the second pattern, and further may include other steps. The resin container manufacturing apparatus according to the second embodiment is an apparatus for manufacturing a resin container using the blow molding method, which includes a second pattern forming device to form a second pattern on a preform and a first pattern forming device to form a first pattern on the preform based on the second pattern, and further may include other devices.

The first pattern forming step and the first pattern forming device, the second pattern forming step and the second pattern forming device, and other steps and other devices in the method for manufacturing a resin container and the apparatus for manufacturing a resin container according to the second embodiment of the present invention are similar to the first pattern forming step and the first pattern forming device, the second pattern forming step and the second pattern forming device, and other steps and other devices in the method for manufacturing a resin container and the apparatus for manufacturing a resin container according to the first embodiment of the present invention, respectively, and thus the description thereof is omitted.

In the method for the resin container manufacturing method and the resin container manufacturing apparatus for manufacturing a resin container according to the second embodiment, the preform is set in the mold and molded into a resin container having a non-cylindrical shape having multiple surfaces by blow molding so that the second pattern, which includes characters or images, does not cross over two or more of the surfaces among the multiple surfaces. Since the second pattern includes characters or images, if the second pattern is formed to extend over two or more surfaces, visibility decreases. In order to increase the visibility, a predetermined angle is calculated by processing with a computer so that the second pattern is read by a camera and formed in the region of the surface of the mold for blow molding. However, such a process or apparatus results in a high cost. By contrast, when the first pattern is formed based on the second pattern, the first pattern can be detected by a low-cost device using a non-contact sensor such as a combination of an LED and a photodiode.

A resin container manufacturing method includes: forming a second pattern on a preform of a resin container; and forming a first pattern on the preform based on a position of the second pattern on the preform.

FIG. 1 is a flowchart of the resin container manufacturing method according to the embodiment. The flow of the resin container manufacturing method according to the present embodiment will be described below.

In step S1, when the first pattern is formed on the preform, the controller of the resin container manufacturing apparatus shifts the processing to step S2. Although the first pattern is formed at a predetermined position of the preform without any particular limitation, it is preferable to form the first pattern in a region of the preform with less irregularities. This is because the neck ring, the screw threaded portion, and the support ring may be difficult to recognize depending on the type of the optical sensor of a recognition apparatus. Further, if the first pattern is formed in a region lower than the content after the content is filled into the completed resin container, it becomes difficult to inspect foreign matter in the manufacturing process. Thus, it is preferable that the first pattern is formed above the region filled with the contents, that is, at the neck portion of the preform. Preferably, the size of the first pattern is small in consideration of the formation time of the first pattern. Recognition of the first pattern depends on the performance of the optical sensor of the recognition apparatus. Preferably, the first pattern has a size recognizable by the recognition apparatus and is smaller. Specifically, the size of the first pattern is preferably 0.1 mm or more and 200 mm or less. When the first pattern is, for example, a longitudinal line, the size of the first pattern represents the maximum length of the longitudinal line in the longitudinal direction. The shape of the first pattern is not particularly limited as long as it can be read by the recognition apparatus and can be appropriately selected according to the purpose. However, it is preferable that the change of the first pattern in the axial direction of the preform is smaller. This is because if the change in the shape of the first pattern in the axial direction of the preform is larger, the position of the first pattern read by the recognition apparatus varies, and the change in the formation position of the second pattern after blow molding also increases.

In step S2, when the position is determined, the process proceeds to step S3. Based on the first pattern formed on the preform, the position of the preform in the circumferential direction with respect to the mold in blow molding is determined.

In the resin container manufacturing method according to the embodiments, further includes: determining the position of the first pattern in a circumferential direction of the preform; and determining a position of the preform in a mold in the circumferential direction based on the position of the first pattern, blowing air into the preform in the mold to form the resin container, the first pattern and the second pattern formed on the preform.

In step S3, when the controller of the resin container manufacturing apparatus forms the second pattern on the preform based on the first pattern, the process proceeds to step S4. Preferably, the second pattern is formed in a region having a high expansion ratio (stretch ratio) of the surface area after blow molding of the preform. The second pattern is formed with images and characters such as a product name and a legal indication, and in order to appeal of the product to customers, a region having a high expansion ratio of the surface area has a smaller processing area at the time of preform formation, so that the time for forming the second pattern on the preform can be reduced and productivity can be increased. The formation position of the second pattern in the circumferential direction is preferably formed so that the outer peripheral portion of the second pattern region or the central portion of the second pattern becomes a predetermined position with respect to the first pattern. The size and shape of the second pattern are not particularly limited as long as images and characters such as a product name and a legal indication satisfy the appeal of the product and predetermined regulations, and can be appropriately selected according to the purpose. However, preferably, the size and shape of the second pattern is small in terms of productivity of processing into the preform. Specifically, the size of the second pattern is preferably 1 mm or more and 200 mm or less. When the second pattern is, for example, an image or a character, the size of the second pattern represents the maximum length of the entire image or character in the width direction.

In step S4, after blowing air into the preform, this process is terminated. Air is blown from the opening of the preform into the preform, the process of the blow molding is performed, and the resin container is manufactured.

A resin container manufacturing method includes: forming a first pattern on a preform of a resin container; and forming a second pattern on the preform based on a position of the first pattern on the preform.

In the resin container manufacturing method according to the embodiments, the second pattern includes at least one of a character, an image, or a figure.

A resin container manufacturing apparatus includes: a first pattern forming device to form a first pattern on a preform of a resin container; and a second pattern forming device to form a second pattern on the preform based on a position of the first pattern on the preform.

Steps S1, S2, and S3 are performed as the same process using a laser irradiation apparatus in the same resin container manufacturing apparatus. Step S4 may be performed using an apparatus different from the laser irradiation apparatus, using a molding apparatus, or using an apparatus in which the laser irradiation apparatus and the molding apparatus are integrated.

Figure 2:
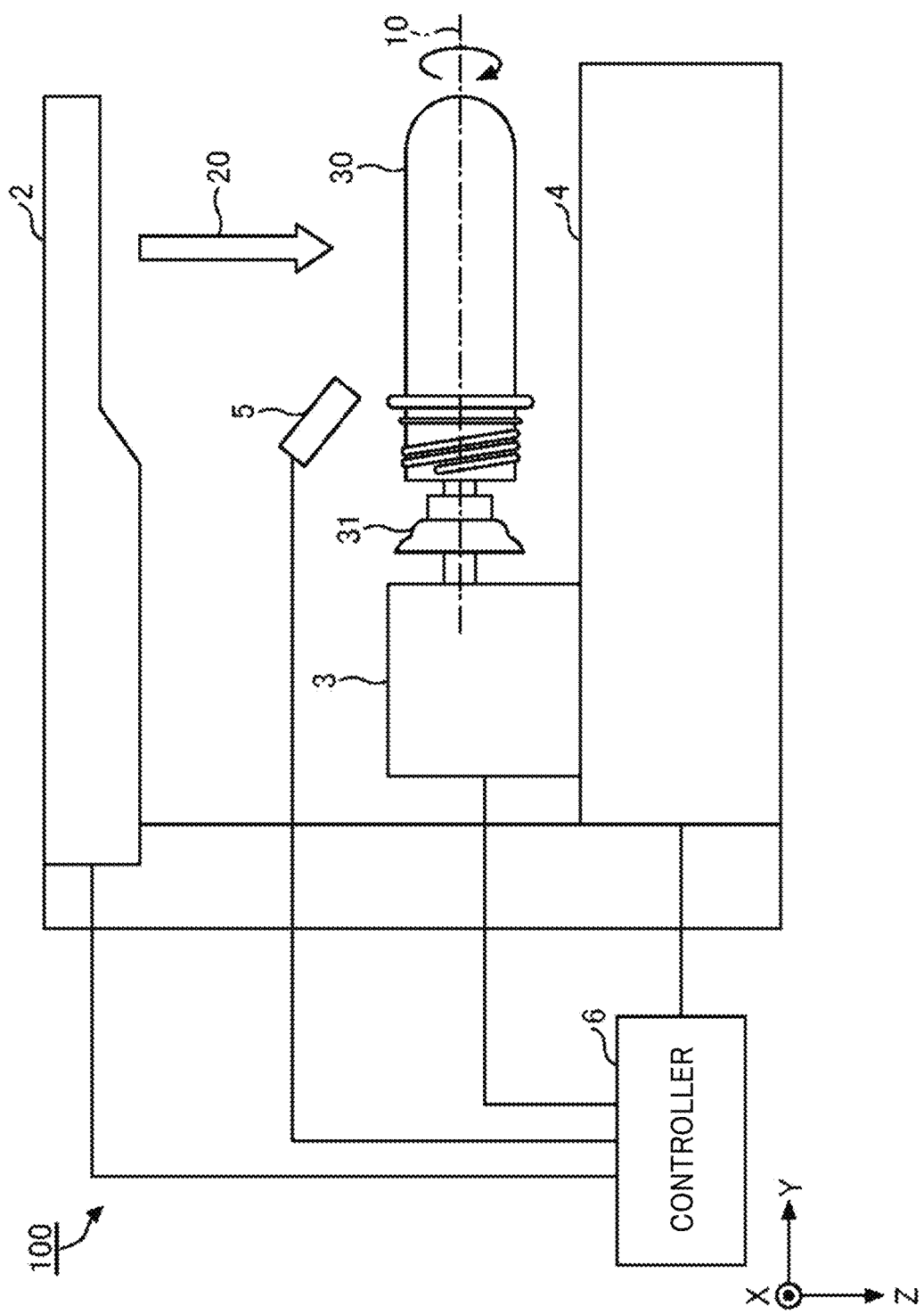
FIG. 2 is a diagram of a configuration of a resin container manufacturing apparatus according to the embodiment.

FIG. 2 is a diagram an example of the configuration of the resin container manufacturing apparatus 100. The resin container manufacturing apparatus 100 is a device to form at least one of the first pattern or the second pattern at least one of on the surface of the base material of the preform 30 or in the interior of the base material of the preform 30 by changing the properties of the base material constituting the preform 30. The property of the base material represents the property or state of the base material.

As illustrated in FIG. 2, the resin container manufacturing apparatus 100 includes a laser irradiation unit 2, a rotation unit 3, a holding unit 31, a movement unit 4, a dust collection unit 5, and a controller 6. The resin container manufacturing apparatus 100 rotatably holds the preform 30 having a cylindrical shape around a cylindrical shaft 10 of the preform 30 with a holding unit 31. Then, at least one of the first pattern or the second pattern is formed on the surface on the preform 30 by irradiating the preform 30 with a laser beam from a laser irradiation unit 2 and changing the properties of the base material constituting the preform 30.

The laser irradiation unit 2 scans the preform 30 with the laser beam emitted from the laser light source in the Y-direction in FIG. 2, and irradiates the preform 30 arranged in the positive Z-direction with the processing laser beam 20.

The rotation unit 3 holds the preform 30 with the holding unit 31. The holding unit 31 is a coupling member connected to a motor shaft of a motor as a driving portion provided in the rotation unit 3, and one end of the holding unit 31 is inserted into the mouth portion of the preform 30 to hold the preform 30. By rotating the holding unit 31 due to the rotation of the motor shaft, the preform 30 held by the holding unit 31 is rotated around the cylindrical shaft 10.

The movement unit 4 is a linear motion stage provided with a table, and the rotation unit 3 is mounted on the table of the movement unit 4. The movement unit 4 moves the table forward and backward in the Y-direction so that the rotation unit 3, the holding unit 31, and the preform 30 are moved together forward and backward in the Y-direction.

The dust collection unit 5 is an air suction device disposed in the vicinity of a portion of the preform 30 irradiated with the processing laser beam 20. The dust collection unit 5 collects the plume and dust by sucking air. The plume and the dust are generated by forming the first pattern by irradiation. The dust collection unit 5 prevents the resin container manufacturing apparatus 100, a preform 30, or the periphery from the contamination by the plume and dust.

The controller 6 is electrically connected to each of the laser light source 21, the scanning unit 23, the rotation unit 3, the movement unit 4, and the dust collection unit 5 through, for example, cables, and outputs control signals to control the operations of the laser light source 21, the scanning unit 23, the rotation unit 3, the movement unit 4, and the dust collection unit 5.

The resin container manufacturing apparatus 100 uses a laser irradiation unit 2 to irradiate the preform 30 with the processing laser beam 20 scanned in the Y-direction while rotating the preform 30 using the rotation unit 3 under the control of the controller 6. Then, at least one of the first pattern or the second pattern is two-dimensionally formed at least one of on or in the base material of the preform 30.

The range of the scanning region in the Y-direction of the processing laser beam 20 by the laser irradiation unit 2 may be limited. Thus, when at least one of the first pattern or the second pattern is formed in a range wider than the scanning region, the resin container manufacturing apparatus 100 shifts the irradiation region of the processing laser beam 20 on the preform 30 in the Y-direction by moving the preform 30 in the Y-direction by the movement unit 4. While the preform 30 is rotated again by the rotation unit 3, the laser irradiation unit 2 scans the preform 30 with the processing laser beam 20 in the Y-direction, thereby forming at least one of the first pattern or the second pattern at least one of on the surface of the base material of the preform 30 or in the interior of the base material of the preform 30. Thus, at least one of the first pattern or the second pattern can be formed in a wider region of the preform 30.

Figure 3:
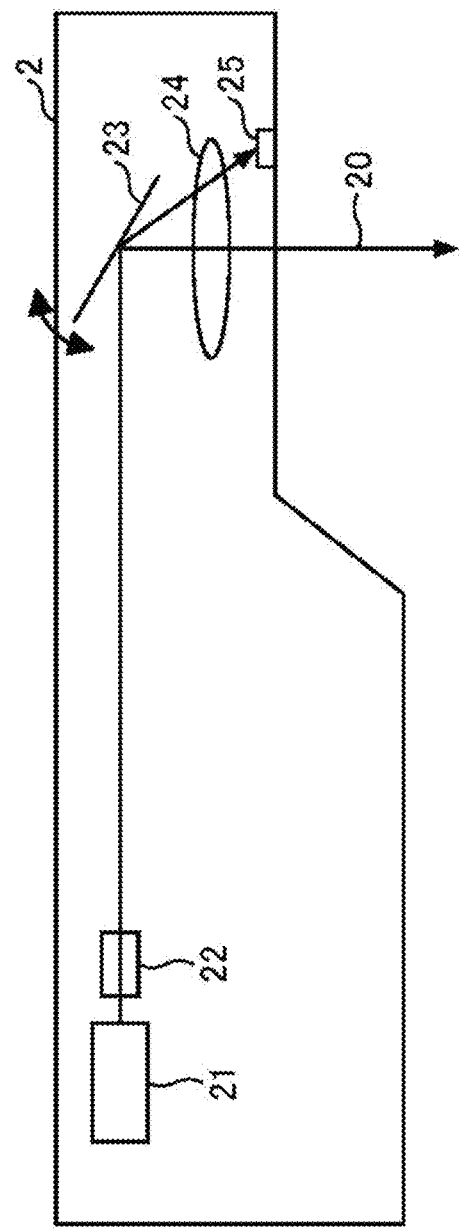
FIG. 3 is a diagram of a configuration of a laser irradiation unit according to the embodiment.

Next, the configuration of the laser irradiation unit 2 will be described. FIG. 3 is a diagram of a configuration of a laser irradiation unit 2 according to the embodiment. As illustrated in FIG. 3, the laser irradiation unit 2 includes a laser light source 21, a beam expander 22, a scanning unit 23, a scanning lens 24, and a synchronization detector 25. The laser light source 21 is a pulse laser that emits a laser beam. The laser light source 21 emits a laser beam having an output (light intensity) suitable for changing the property of at least one of on the surface of the base material of the preform 30 or in the interior of the base material of the preform 30.

The laser light source 21 can control the on-off control (i.e., turning on and off) of emission of laser light, emission frequency control, and light intensity control. As an example of the laser light source 21, the laser light source can emit a light beam having a wavelength of 532 nm, a pulse width of the laser beam of 16 picoseconds, and an average output of 4.9 W. The diameter of the laser beam in the region of the preform 30 in which the properties of the base material are changed is preferably 1 µm or more and 200 µm or less.

The laser light source 21 may include one laser light source or multiple laser light sources. When multiple laser light sources are used, the on-off control, the emission frequency control, or the light intensity control may be performed independently for each laser light source.

The diameter of the parallel laser beam emitted from the laser light source 21 is expanded by the beam expander 22 and enters the scanning unit 23.

The scanning unit 23 includes a scanning mirror for changing the reflection angle by a driving unit such as a motor. The scanning unit 23 deflects the incident laser beam by changing the angle of the scanning mirror to scan in Y-direction. As the scanning mirror, a galvano-mirror, polygon mirror, or a micro electro mechanical system (MEMS) mirror can be used.

In the present embodiment, the scanning unit 23 performs one-dimensional scanning of the laser beam in the Y-direction as an example, but the embodiment is not limited to the example. The scanning unit 23 may perform two-dimensional scanning of the laser beam in the X-direction and the Y-direction using a scanning mirror that changes the reflection angle in two orthogonal directions.

However, in the case where the surface of the preform 30 having a cylindrical shape is irradiated with the laser beam, when two-dimensional scanning is performed in the X-direction and the Y-direction, the beam spot diameter on the surface of the preform 30 changes according to the scanning in the X-direction. In such a case, one-dimensional scanning is preferable.

The scanning unit 23 irradiates at least one of on the surface of the base material of the preform 30 or the interior of the base material of the preform 30 with the laser beam scanned by the scanning unit 23 as a processing laser beam 20.

The scanning lens 24 is an fθ lens that keeps the scanning speed of the processing laser beam 20 deflected by the scanning unit 23 constant and converges the processing laser beam 20 at a predetermined position at least one of on the surface of the base material of the preform 30 or in the interior of the base material of the preform 30. Preferably, the scanning lens 24 and the preform 30 are arranged so that the beam spot diameter of the processing laser beam 20 is minimized in the region of the preform 30 in which the property of the base material is changed. The scanning lens 24 may be configured by a combination of multiple lenses.

The synchronization detector 25 outputs a synchronization detection signal used to synchronize the scanning of the processing laser beam 20 with the rotation of the preform 30 by the rotator unit 3. The synchronization detector 25 includes a photodiode for outputting an electric signal corresponding to the intensity of the received light, and outputs the electric signal from the photodiode as a synchronization detection signal to the controller 6.

In FIG. 3, the processing laser beam is deflected to scan as an example. By contrast, a processing laser beam array in which a large number of processing laser beams are provided within a range of a printing width (a laser beam array configuration). In the laser beam array configuration, when the preform 30 is rotated, a large number of processing laser beams scans the preform 30 in one direction.

FIG. 4 is a block diagram of a functional configuration of a controller 6 as an example. As illustrated in FIG. 4, the controller 6 includes a pattern data input unit 61, a pattern parameter designation unit 62, a storage unit 63, a processing data generation unit 64, a laser irradiation control unit 65, a laser scanning control unit 66, a rotation control unit 67, a movement control unit 68, and a dust collection control unit 69.

The pattern data input unit 61 inputs pattern data of at least one of the first pattern or the second pattern to be formed at least one of on the surface of the base material of the preform 30 or in the interior of the base material of the preform 30 from an external device such as a personal computer (PC) or a scanner. The pattern data of at least one of the first pattern or the second pattern is electronic data including information indicating a code such as a bar code or a QR code (registered trademark) or a pattern such as a character, a graphic or a photograph, and information indicating at least one type of the first pattern or the second pattern.

However, the pattern data of at least one of the first pattern or the second pattern is not limited to the pattern data input from an external device. Data of at least one of the first pattern or the second pattern generated by the user of the resin container manufacturing apparatus 100 using the keyboard and the pointing device of the controller 6 can be input.

The pattern data input unit 61 outputs pattern data of at least one of the input first pattern or the input second pattern to each of the processing data generation unit 64 and the pattern parameter designation unit 62.

The pattern parameter designation unit 62 specifies a processing parameter to form at least one of the first pattern or the second pattern.

The processing parameter of at least one of the first pattern or the second pattern is information to specify the type, thickness, and processing depth of a line as at least one of the first pattern or the second pattern, or the interval or arrangement of adjacent lines in an aggregate of lines. The processing parameter of at least one of the first pattern or the second pattern is also information to specify the type, size, processing depth of the point as at least one of the first pattern and the second pattern, or the interval or arrangement between adjacent points in the aggregate of points.

The line type is information to indicate a straight line, or a curved line. The point type is information to indicate the shape of the point such as a circle, an ellipse, a rectangle, or a rhombus. At least one of the first pattern or the second pattern may be configured to have periodicity, or may be configured to be non-periodic. However, a configuration having periodicity is preferable because designation of parameters can be further simplified.

A processing parameter of at least one of the first pattern or the second pattern suitable for increasing visibility corresponding to at least one type of the first pattern or the second pattern such as a character, code, figure, or photograph is determined in advance of the processing by experiment or simulation. The storage unit 63 stores a table of a correspondence relation between at least one type of the first pattern or the second pattern and the processing parameter.

The pattern parameter designation unit 62 can acquire and specify the processing parameter of at least one of the first pattern or the second pattern by referring to the storage unit 63 based on the information indicating the type of at least one of the first pattern or the second pattern input from the pattern data input unit 61.

However, the method of designation by the pattern parameter designation unit 62 is not limited to the method described above. The pattern parameter designation unit 62 may receive an instruction from a user via a keyboard or a pointing device of the controller 6, and acquire a processing parameter of at least one of the first pattern or the second pattern by referring to the storage unit 63 based on the instruction.

Further, the pattern parameter designation unit 62 may acquire processing parameters of at least one of the first pattern or the second pattern generated by the user of the resin container manufacturing apparatus 100 using the keyboard or the pointing device of the controller 6.

The processing data generation unit 64 generates processing data for forming at least one of the first pattern or the second pattern on the basis of pattern data of at least one of the first pattern or the second pattern and processing parameters of at least one of the first pattern or the second pattern.

The processing data includes rotation condition data for the rotator unit 3 to rotate the preform 30, scanning condition data for the laser irradiation unit 2 to perform the scanning of the processing laser beam 20, and irradiation condition data for the laser irradiation unit 2 to perform the irradiation of the processing laser beam 20 in synchronization with the rotation of the preform 30. The movement unit 4 also includes movement condition data for the movement unit 4 to move the preform 30 in the Y-direction and dust collection condition data for the dust collection unit 5 to perform dust collection operation.

The processing data generation unit 64 outputs the generated processing data to each of the laser irradiation control unit 65, the laser scanning control unit 66, the rotation control unit 67, the movement control unit 68, and the dust collection control unit 69.

The laser irradiation control unit 65 includes the light intensity control unit 651 and the pulse control unit 652, and controls irradiation of the processing laser beam 20 onto the preform 30 by the laser light source 21 on the basis of irradiation condition data. Further, the laser irradiation control unit 65 controls the irradiation timing of the processing laser beam to the preform 30 in synchronization with the rotation of the preform 30 by the rotation unit 3 based on the synchronization detection signal from the synchronization detector. The irradiation timing control using the synchronization detection signal can be applied to or incorporated by a known technique described in, for example, Japanese Unexamined Patent Application Publication No. 2008-073894. Herein, the detailed description thereof is omitted.

When the laser light source 21 includes multiple laser light sources, the laser irradiation control unit 65 performs the control described above independently for each of the multiple laser light sources.

The light intensity control unit 651 controls the light intensity of the processing laser beam 20, and the pulse control unit 652 controls the pulse width and irradiation timing of the processing laser beam 20.

The laser scanning control unit 66 controls the scanning of the processing laser beam by the scanning unit 23 based on the scanning condition data. Specifically, the on-off control of driving the scanning mirror and control of driving frequency are performed.

The rotation control unit 67 controls the on-off control of the rotation driving, a rotation angle, a rotation direction, and a rotation speed of the preform by the rotation unit 3 based on the rotation condition data. The rotation control unit 67 may continuously rotate the preform 30 in a predetermined rotational direction, or may reciprocate the preform 30 within a predetermined angle range such as ±90 degrees while switching the rotational direction.

The movement control unit 68 controls the on-off control of the movement drive of the preform 30, the movement direction, the movement amount, and the movement speed of the preform 30 by the movement unit 4 based on the movement condition data.

The dust collection control unit 69 controls the on-off control of dust collection by the dust collection unit 5, the flow rate, and flow velocity of air to be sucked based on the dust collection condition data. A device for moving the dust collection unit 5 may be provided, and the movement of the dust collection unit 5 by the device may be controlled so that the dust collection unit 5 is disposed in the vicinity of the position irradiated with the processing laser beam 20.

The change in property of the base material of the preform 30 by irradiation of the processing laser beam 20 will be described. FIGS. 5A to 5D are diagrams of an example of change in property of the base material of the preform by irradiation of the processing laser beam 20.

Figure 5A:
FIG. 5A is a diagram of a shape change due to evaporation as an example of change in property of a base material in a preform
Figure 5B:
FIG. 5B is a diagram of a shape change due to melting as an example of change in property of the base material in the preform.

FIG. 5A is a diagram of shape of the concave portion formed by evaporating the base on the surface of the preform. FIG. 5B is a diagram of a shape of the concave portion formed by melting the base on the surface of the preform. In the case of FIG. 5B, the peripheral edge portion of the concave portion is raised as compared with that of the concave portion in FIG. 5A.

Figure 5C:
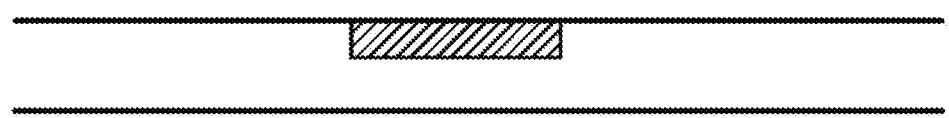
FIG. 5C is a diagram of a change in a crystallized state as an example of change in property of the base material in the preform.
Figure 5D:
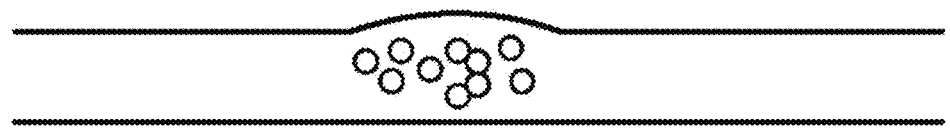
FIG. 5D is a diagram of a change in a foamed state as an example of change in property of the base material in the preform.

FIG. 5C is a diagram of a change in the crystallization state of the surface of the substrate of the preform, and FIG. 5D is a diagram of a change in the foaming state of the interior of the substrate of the preform.

In such a way, at least one of the first pattern or the second pattern can be formed on the surface or inside of the preform by changing the shape of the surface of the preform or changing the property such as the crystallized state of the substrate surface or the foamed state of the inside of the substrate.

As a method for forming a concave shape by evaporation of a base material on the surface of a preform, for example, a pulse laser having a wavelength of 355 nm to 1064 nm and a pulse width of 10 fs to 500 nm or less is irradiated. As a result, the base material in the portion irradiated with the laser beam evaporates, and minute concave portions can be formed on the surface.

Further, by irradiating a continuous wave (CW) laser having a wavelength of 355 nm to 1064 nm, the base material can be melted to form the concave portion. Further, when the laser beam is continuously irradiated even after the base material has melted, the inside and the surface of the base material can be foamed and become opaque.

In order to change the crystallization state, for example, by using PET as a base material and irradiating a CW laser having a wavelength of 355 nm to 1064 nm to raise the temperature of the base material at once, and then gradually cooling the base material by reducing, for example, the laser power, the PET of the base material can be brought into a crystallized state, thereby making the PET of the base material opaque. When the temperature is raised and then rapidly cooled by turning off the laser beam, the PET becomes amorphous and transparent.

The change in the base material property of the preform is not limited to those illustrated in FIG. 5. The properties of the base of resin may be changed by yellowing, oxidation, or surface modification.

Embodiments of the resin container manufacturing method and a resin container manufacturing apparatus will be described in detail with reference to the drawings. In the drawings, the same components are denoted by the same reference numbers, and redundant description may be omitted. In addition, the number, position, and shape of the constituent members described below are not limited to those in the present embodiment, and can be set to the number, position, or shape preferable for implementing the present embodiment.

First Embodiment

Figure 6A:
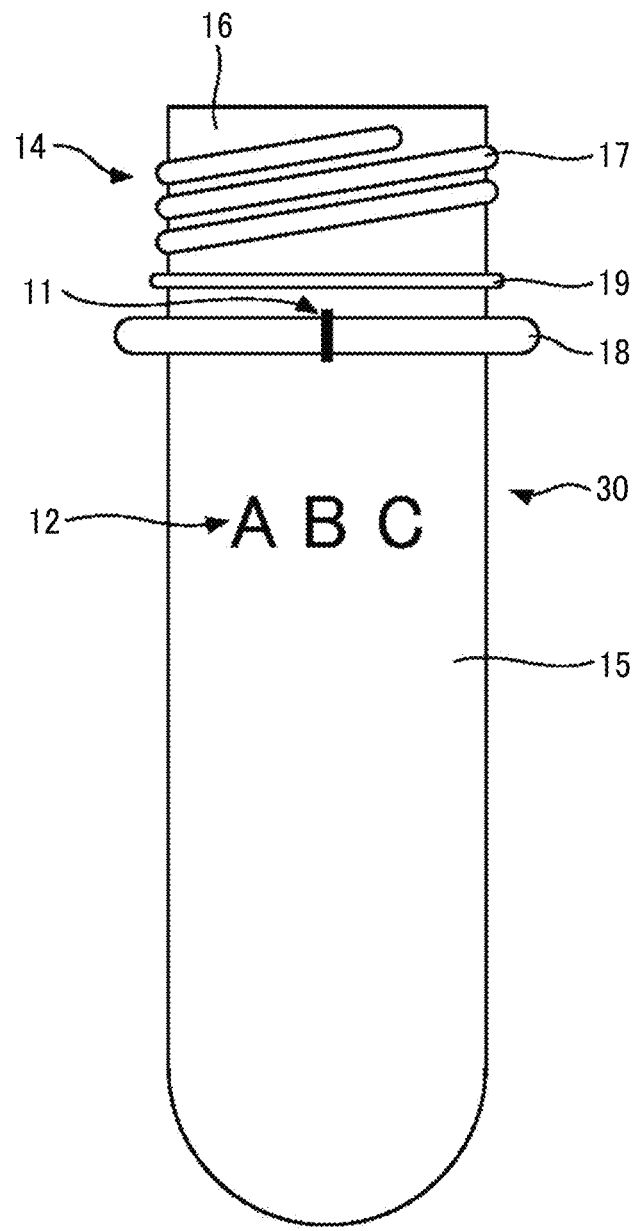
FIG. 6A is a diagram of an example of a first pattern and a second pattern formed on the preform.
Figure 6B:
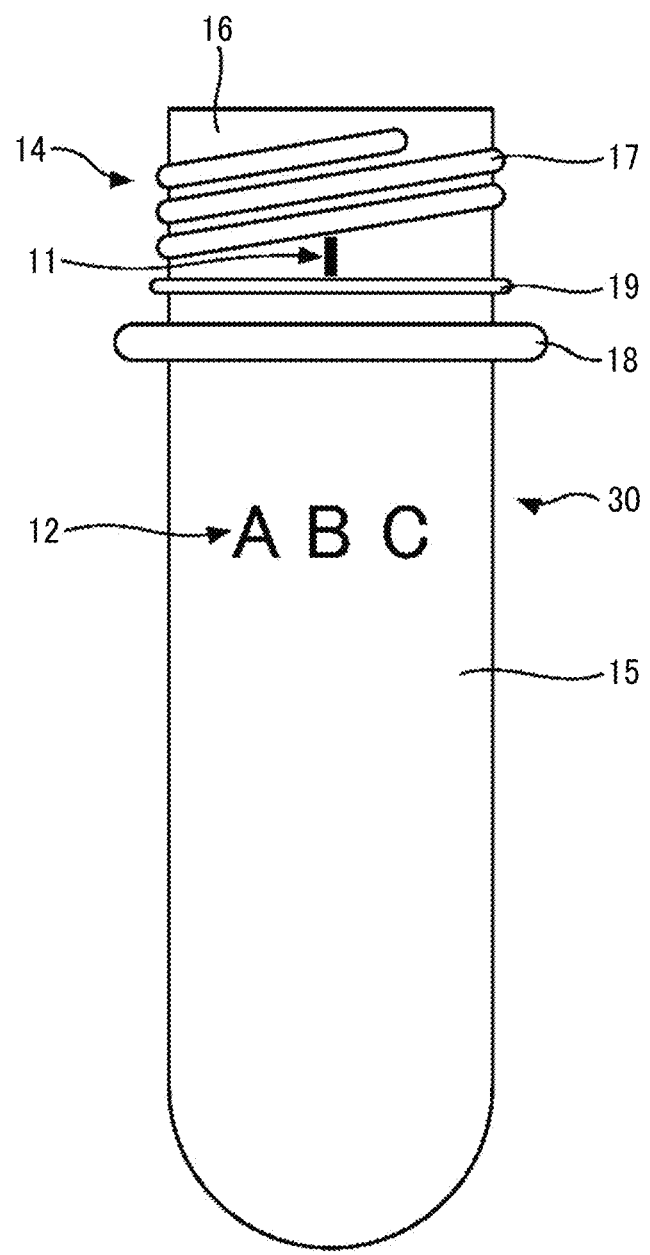
FIG. 6B is a diagram of another example of the first pattern and the second pattern formed on the preform.

FIGS. 6A and 6B are diagrams of a preform 30 having a first pattern 11 and a second pattern 12 formed thereon. The preform 30 has a neck portion 14 and a body portion 15 (body). The neck portion 14 includes a flat portion 16, a screw threaded portion 17 (male thread), a neck ring 18, and a support ring 19. The screw threaded portion 17 is formed in the flat portion 16, and is screwed and fastened to the cap to be sealed. The neck ring 18 and the support ring 19 are formed so as to protrude from the flat portion 16. In FIG. 6A, the first pattern 11 is formed on the neck ring 18. In FIG. 6B, the first pattern 11 is formed on the flat portion 16. In FIGS. 6A and 6B, the second pattern 12 is formed in the body portion 15.

The first pattern forming device to form the first pattern 11 and the second pattern forming device to form the second pattern 12 may be the same device or different device. Further, the first pattern forming device may be a mold processed so that a shape such as a notch is formed on the mold at the time of injection molding of the preform 30, or may be a printing device such as an inkjet printer or a laser marking device. Further, the second pattern 12 may be formed after the first pattern 11 is formed, or the second pattern 12 may be formed after the first pattern forming step and the second pattern 12 may be formed after the first pattern forming step. By contrast, the first pattern 11 may be formed after the second pattern 12 is formed, or the first pattern 11 may be formed after another process is performed after the second pattern 12 is formed. Preferably, the step of forming the first pattern 11 and the step of forming the second pattern 12 are the identical steps. More preferably, the first pattern forming step and the second pattern forming step are the identical steps because the positional deviation (displacement) between the patterns becomes small each other, and in the case of the same device, the positional deviation becomes small.

Second Embodiment

Figure 7:
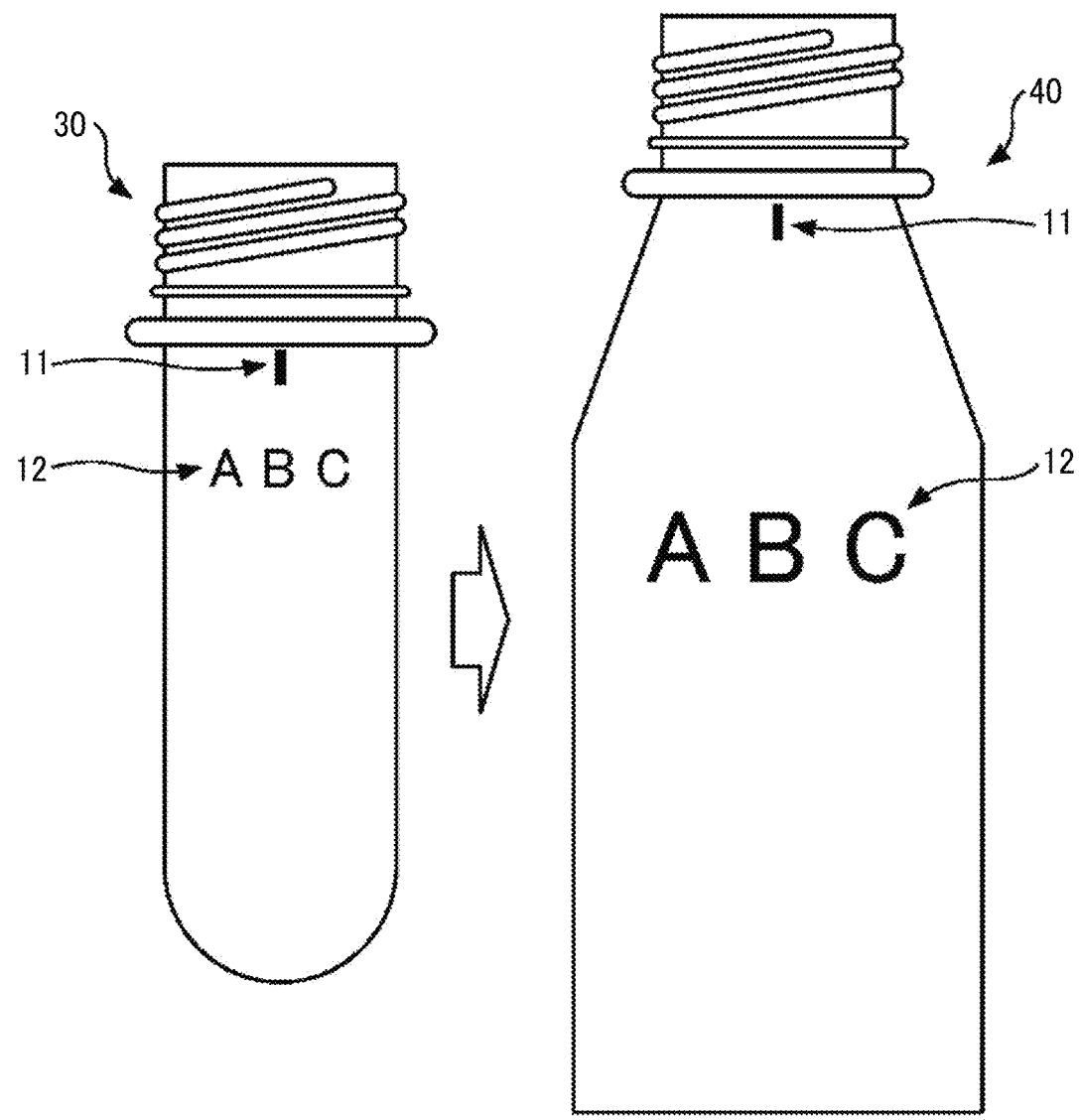
FIG. 7 is a diagram of the preform and the resin container before and after blow molding in the case where the first pattern is formed in the vicinity of an opening through which air is blown.

FIG. 7 is a diagram of the preform 30 and the resin container 40 before and after blow molding when the first pattern 11 and the second pattern 12 are formed in the preform 30, and the first pattern 11 formed in the preform 30 is in the vicinity of the opening through which air is blown into the preform 30. In FIG. 7, since the expansion rate after blow molding is small at a portion of the preform 30 closer to the opening through which air is blown and in which the first pattern 11 is formed, if the portion is set as a subject of inspection in advance of the processing by the appearance inspection apparatus, there is no error in the appearance inspection.

The resin container manufacturing method according to the embodiments, further includes: blowing air into the preform on which the first pattern and the second pattern are formed to form the resin container. The forming the first pattern forms the first pattern in a first region in a vicinity of an opening of the preform and the blowing blows the air into the preform through the opening.

Figure 8:
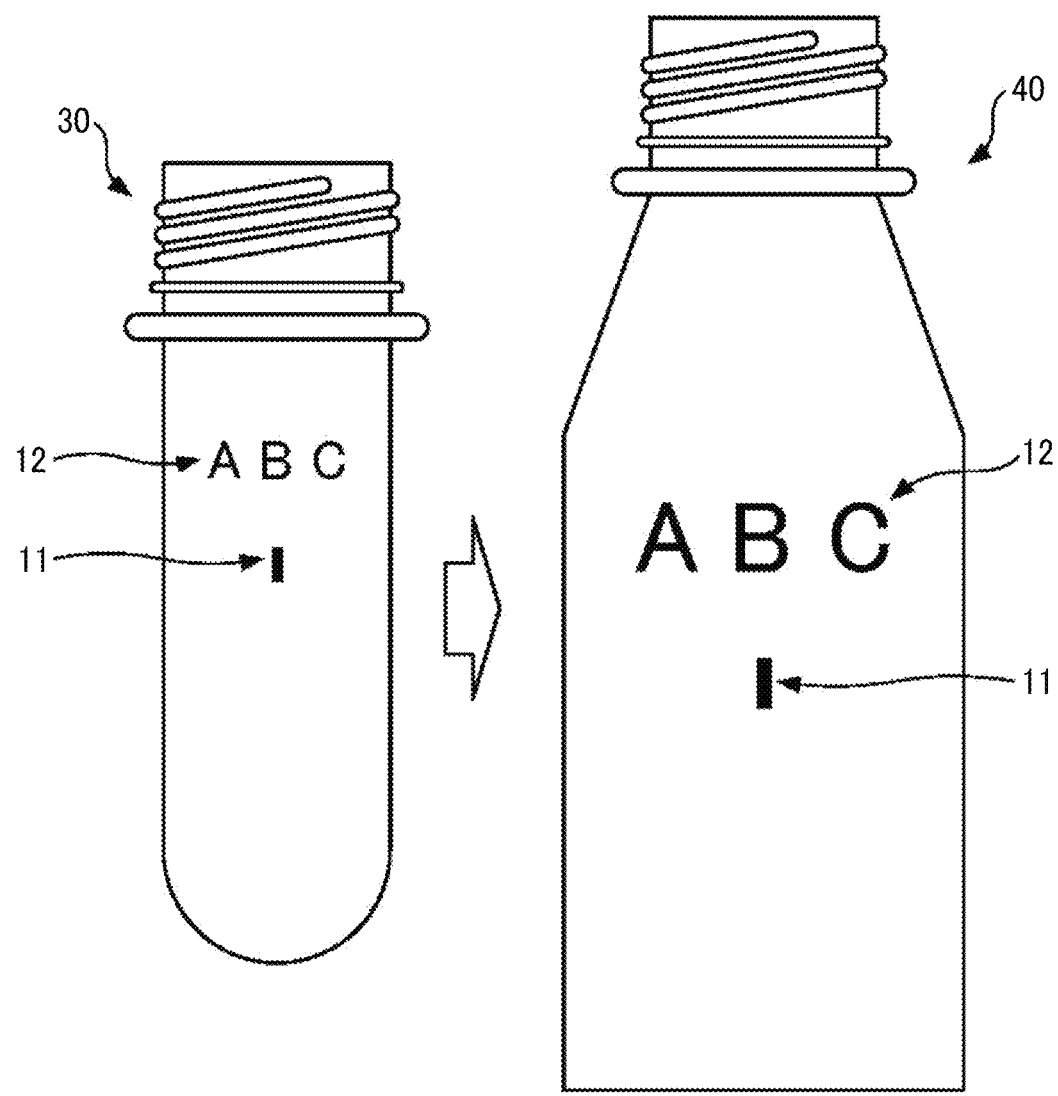
FIG. 8 is a diagram of the preform and the resin container before and after blow molding in the case where the first pattern is formed further away from the opening through which air is blown.

FIG. 8 is a diagram of the preform 30 and the resin container 40 before and after blow molding when the first pattern 11 and the second pattern 12 are formed on the preform 30, and the first pattern 11 formed on the preform 30 is far away from the opening through which air is blown into the preform 30. In FIG. 8, the portion of the preform 30 in which the first pattern 11 is formed and which is away from the opening through which air is blown is below the second pattern 12 which is away from the opening through which air is blown, and the expansion rate after blow molding is higher than that in FIG. 7, so that visual errors may occur. For example, the first pattern may be detected as an error in the appearance inspection, or a consumer may be given an impression that a foreign substance is mixed therein after sales. Thus, preferably, the first pattern 11 is formed at a position in the vicinity of the opening through which air is blown, in which the expansion rate after blow molding is smaller.

Figure 9:
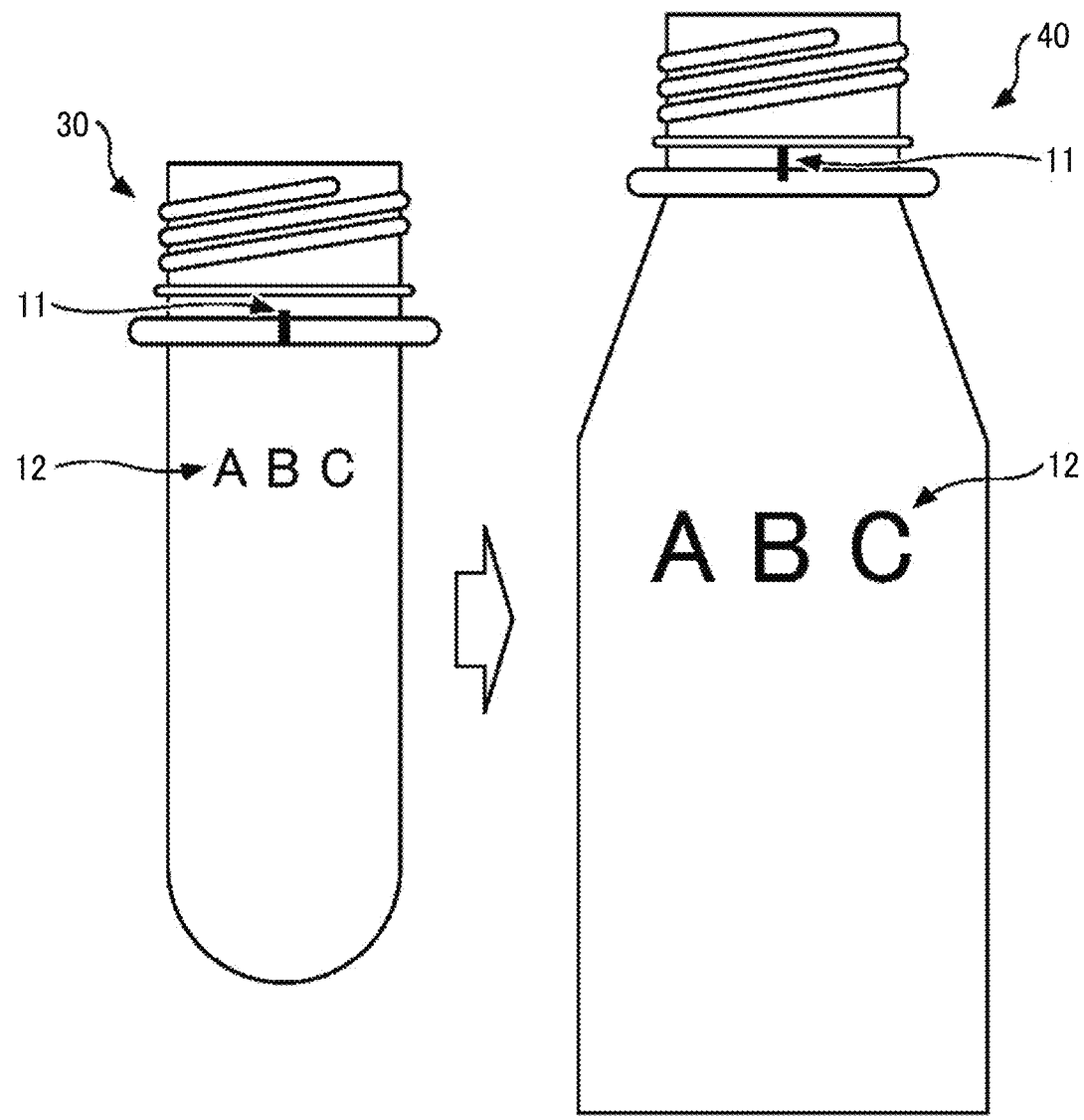
FIG. 9 is a diagram of the preform and the resin container before and after blow molding in a case where the first pattern is formed in a non-deformation region.
Figure 10:
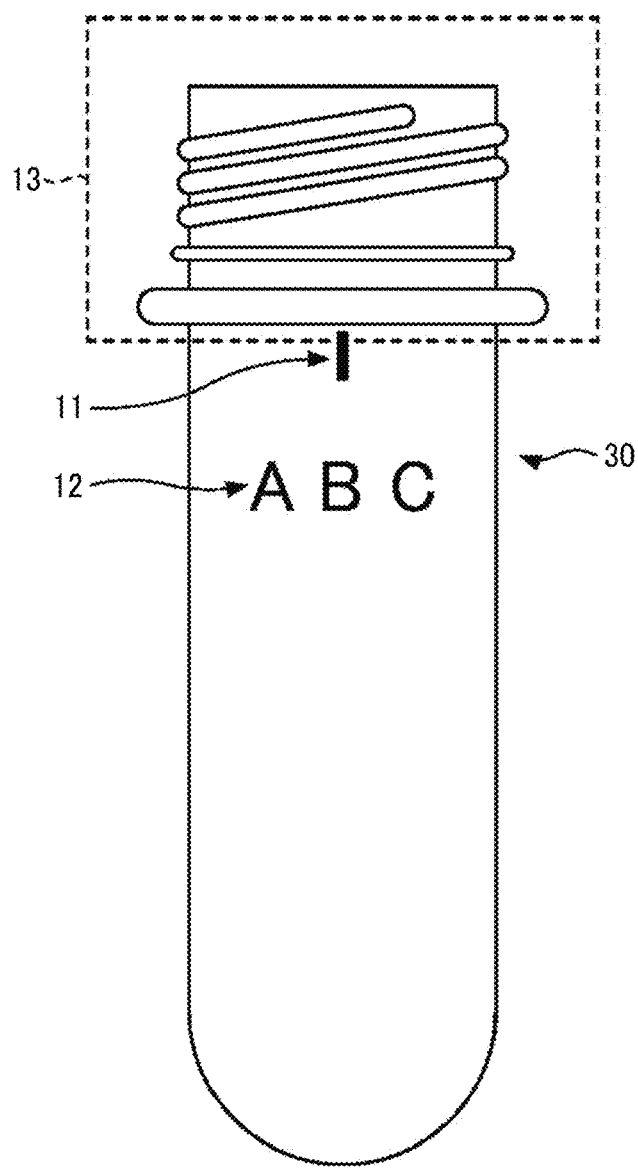
FIG. 10 is a diagram of the non-deformation region of the preform before blow molding.
Figure 11A:
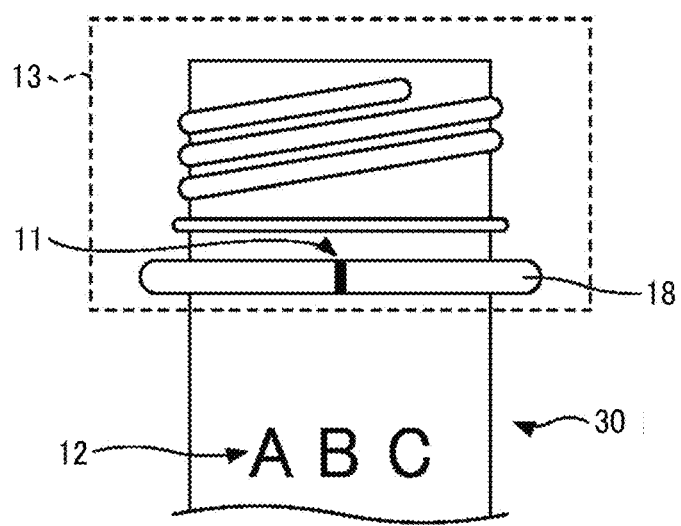
FIG. 11A is a diagram of an example of a formation of the first pattern.
Figure 11B:
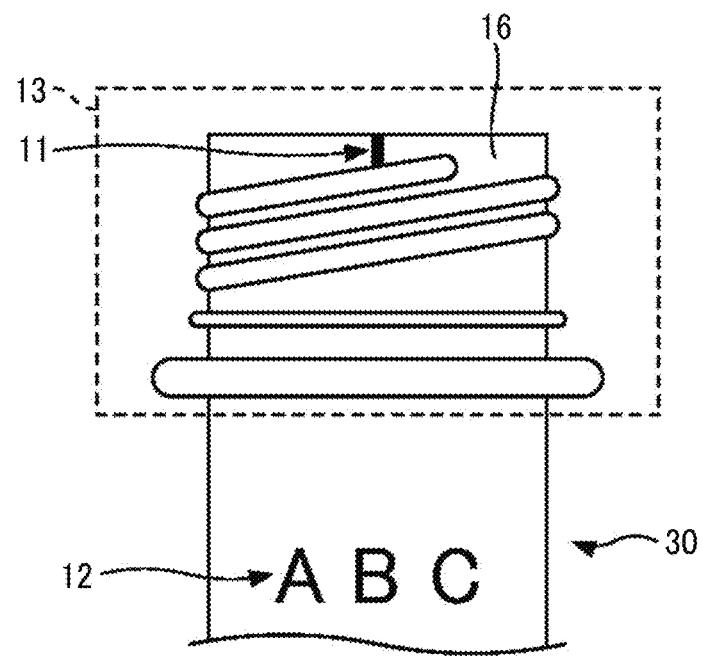
FIG. 11B is a diagram of an example of another formation of the first pattern.
Figure 11C:
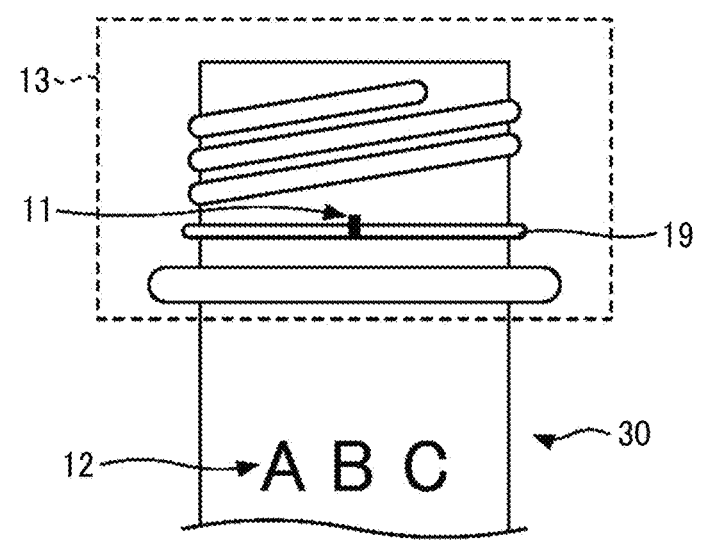
FIG. 11C is a diagram of an example of still another formation of the first pattern.

FIG. 9 is a diagram of the preform 30 and the resin container 40 before and after blow molding when the first pattern 11 and the second pattern 12 are formed on the preform 30, and the first pattern 11 is formed in a non-deformation region. As illustrated in FIG. 9, as an advantage, the first pattern 11 is not detected as an error because the first pattern 11 is formed in a non-deformation region that does not deform when the preform 30 is formed by blow molding, and the non-deformation region is not subject to the appearance inspection after blow molding and after content filling. The non-deformed region 13 is a region illustrated in FIG. 10, which is not expanded in blow molding, and it is preferable that the first pattern 11 is formed in the non-deformed region 13. For example, the first pattern 11 is formed on the neck ring 18 in FIG. 11A. FIG. 11B is a diagram of the first pattern 11 formed on a flat portion 16 in the vicinity of the opening through which air is blown into the preform. FIG. 11C is a diagram of the first pattern 11 formed on the support ring 19.

In the resin container manufacturing method according to the embodiments, further includes: blowing air into the preform on which the first pattern and the second pattern are formed to form the resin container, the forming the first pattern forms the first pattern in the first region of the preform, and an amount of deformation of the first region by the blowing is smaller than an amount of deformation in a second region other than the first region of the preform by the blowing.

Third Embodiment

Figure 12:
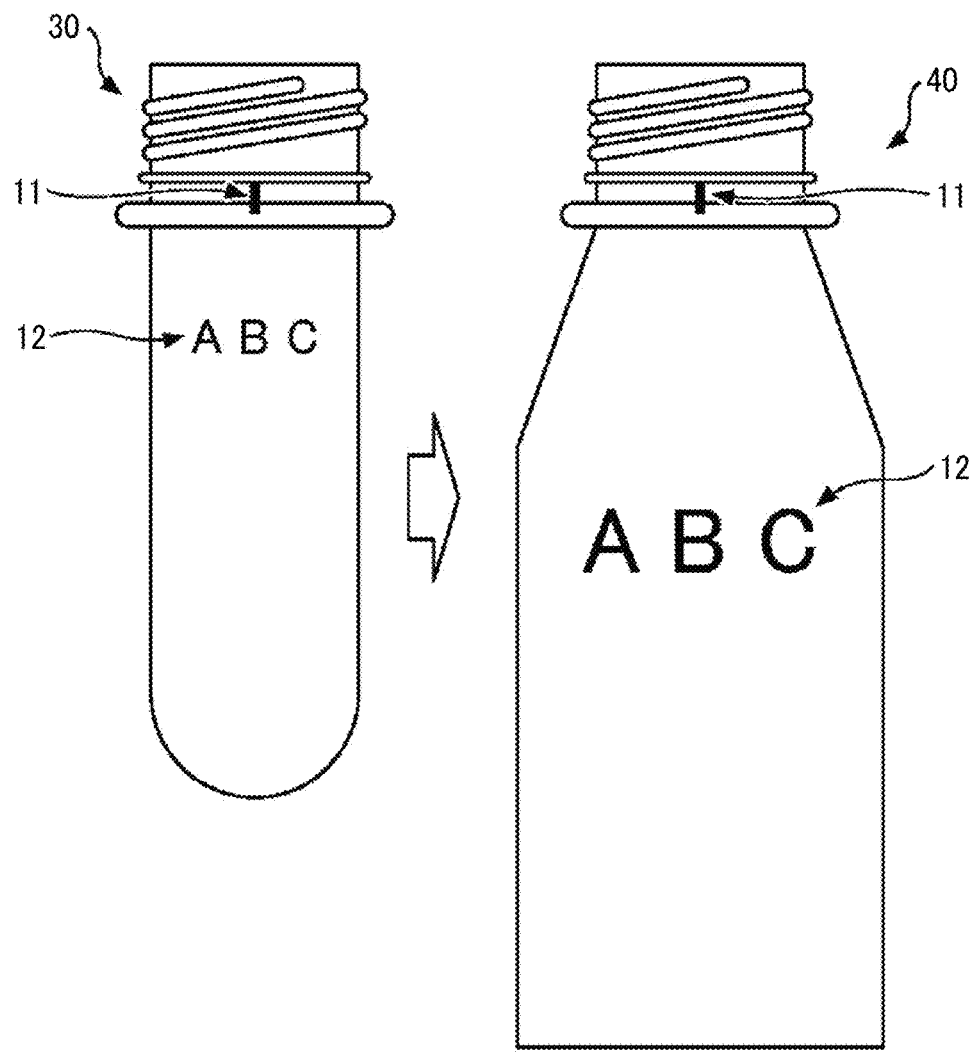
FIG. 12 is a diagram of an example of the second pattern formed on a cylindrical resin container formed by blow molding.
Figure 13:
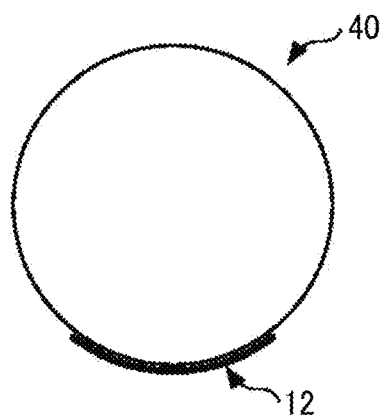
FIG. 13 is a diagram of a portion of the cylindrical resin container on which the second pattern is formed.
Figure 14:
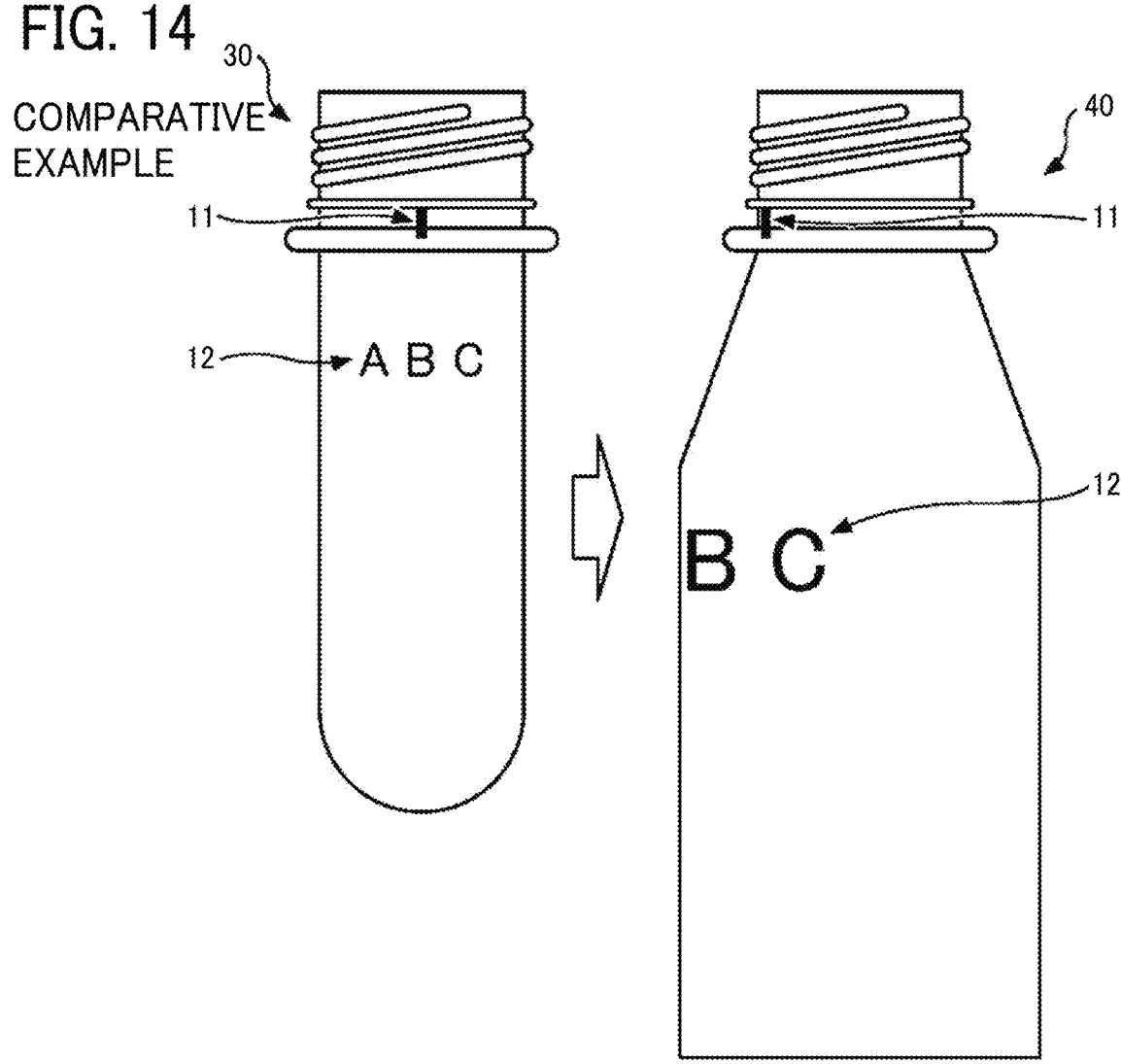
FIG. 14 is a diagram of the second pattern formed on a non-cylindrical resin container formed by blow molding.
Figure 15:
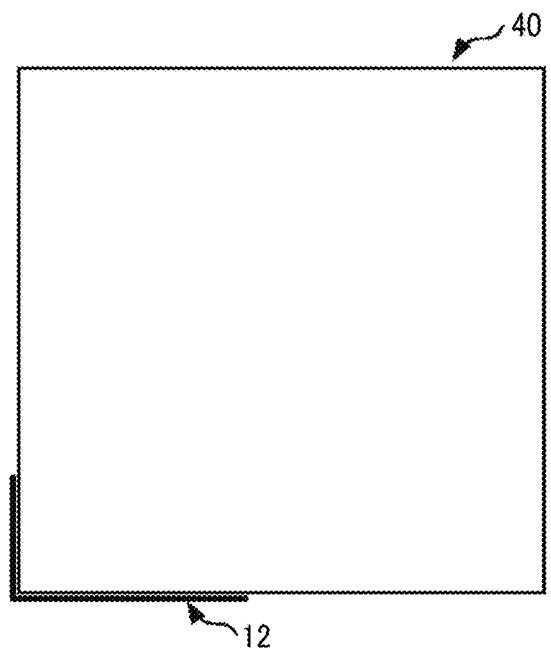
FIG. 15 is a diagram of a portion the non-cylindrical resin container on which the second pattern is formed.
Figure 16:
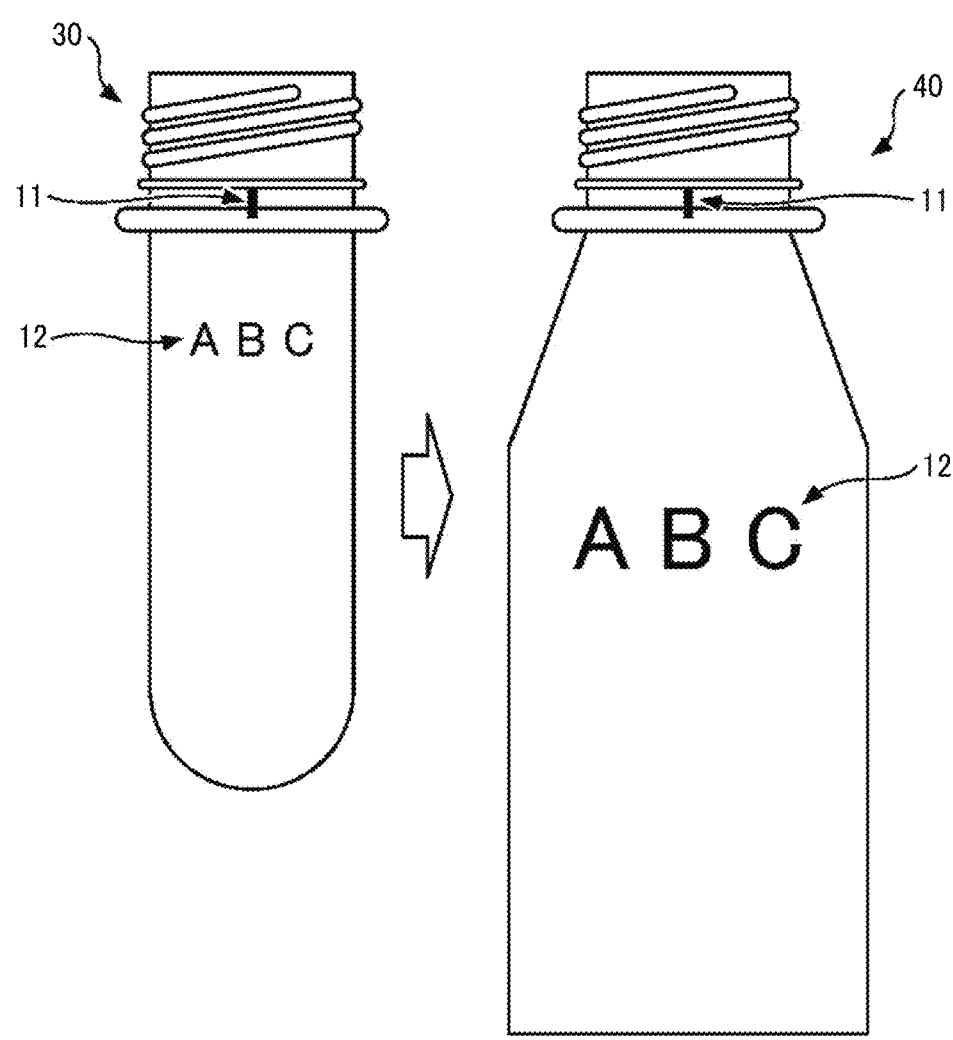
FIG. 16 is a diagram of an example of the second pattern formed on the non-cylindrical resin container formed by blow molding.

As illustrated in FIG. 12, when the preform 30 is molded into the resin container having a body having a cylindrical shape in cross section by blow molding, the second pattern 12 is constantly enlarged to the side surface of the body of the cylindrical shape (i.e., cylindrical surface). Thus, as illustrated in FIG. 13, the second pattern 12 is constantly enlarged at the same rate at any position of the cylindrical surface. However, as illustrated in FIG. 14, when the preform 30 is molded into the resin container 40 having a body having a non-cylindrical shape in cross section by blow molding without setting the preform 30 in a mold at a predetermined angle based on the first pattern 11, the second pattern 12 is formed across multiple surfaces as illustrated in FIG. 15, which causes errors in appearance and design. By contrast, if the first pattern 11 and the second pattern 12 have a fixed arrangement, the preform 30 can be easily adjusted in the circumferential direction at a predetermined angle based on the first pattern 11, so that the second pattern 12 can be formed correctly as illustrated in FIG. 16. Preferably, the first pattern 11 is read by a camera, and the result of the reading is processed by a computer to calculate a predetermined angle to detect the first pattern 11. More preferably, the first pattern 11 is detected using a non-contact sensor, for example, a combination of an LED and a photodiode to achieve a non-contact sensor at low cost. On the other hand, the second pattern 12 is also read by a camera, and the result of the reading is processed by a computer to calculate a predetermined angle to detect the first pattern 11.

The resin container manufacturing method according to the embodiments, further includes: blowing air into the preform on which the first pattern and the second pattern are formed to form the resin container having a noncircular cross-sectional shape having multiple surfaces, and the forming the second pattern forms the second pattern on at least one surface among the multiple surfaces.

The shape of the first pattern 11 is not particularly limited and can be appropriately selected according to the purpose. Preferably, the first pattern 11 is formed as a straight line parallel to the axial direction of the resin container 40 to increase the accuracy of calculating a predetermined angle. In addition, when the length of the first pattern 11 is shortened within the range detectable by the non-contact sensor, the time for laser marking of the first pattern 11 is reduced, and the time for laser marking of the first pattern and the second pattern by the same laser marking device is also reduced, so that the productivity of the resin container can be increased.

Fourth Embodiment

Figure 17:
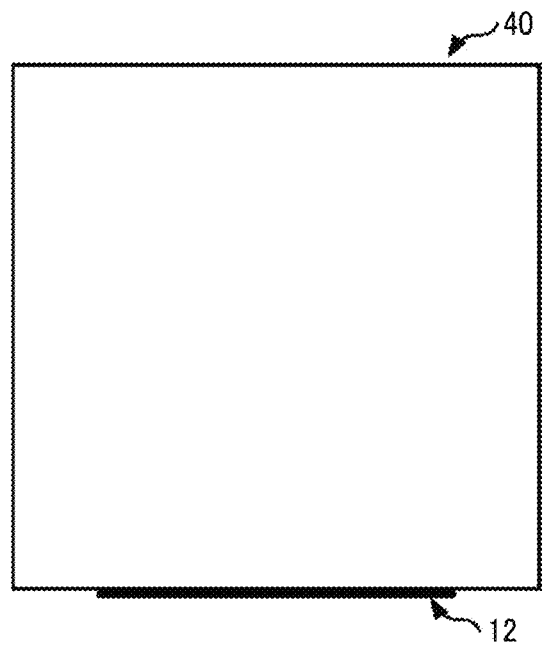
FIG. 17 is a diagram of an example of a portion of the non-cylindrical resin container on which the second pattern is formed.
Figure 18:
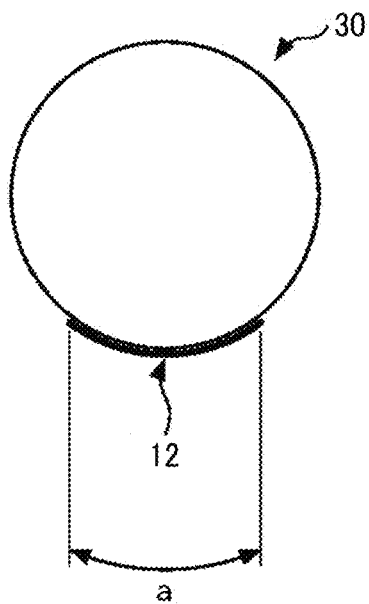
FIG. 18 is a cross-sectional view of the second pattern formed on the preform.
Figure 19:
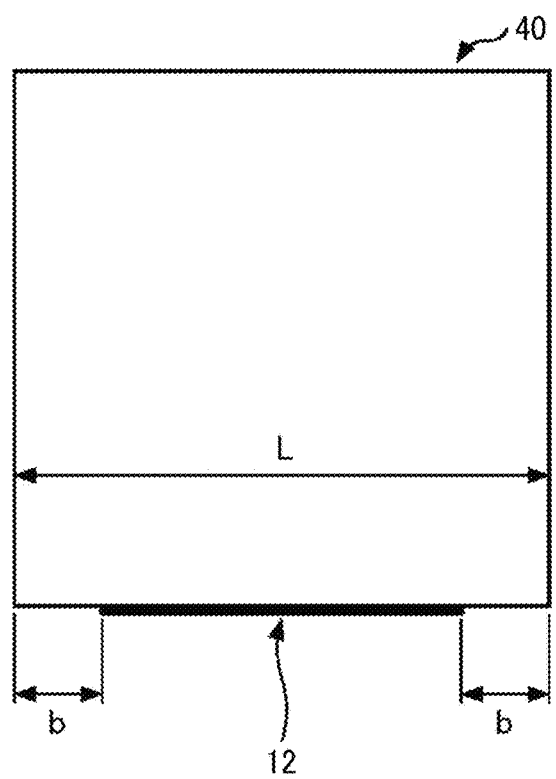
FIG. 19 is a cross-sectional view of another example of the second pattern formed on the non-cylindrical resin container formed by blow molding.

When the preform 30 is mold into a resin container 40 having a body having a non-cylindrical shape in a cross section by blow molding, as illustrated in FIG. 17, even if the arrangement of a second pattern 12 is determined in the circumferential direction at a predetermined angle based on a first pattern 11, distortion occurs in the circumferential direction of the resin container 40 at the time of blow molding, the second pattern 12 is displayed across multiple surfaces, and errors in appearance and design may occur. In the case of blow molding, since the resin container is not entirely expanded at exactly the same expansion rate, the second pattern 12 at a certain distance or more from the edge of the surface of the resin container on which the second pattern is formed is set. When an equation below is satisfied, the second pattern does not cross the multiple surfaces.

$$L-[(a\times\alpha)+(b\times 2)]\geq 0,$$

where a is a length [mm] in a circumferential direction of the second pattern formed in the preform, $\alpha$ is an expansion ratio [%] in the circumferential direction after blow molding of the second pattern, L is a length [mm] of a width direction of a surface of the resin container in which the second pattern is formed after blow molding, and b is a distance [mm] between an outer peripheral portion of the second pattern and an edge of a closest surface (FIG. 19).

The distance b between the outer peripheral portion of the second pattern 12 and the edge of the closest surface is preferably 3 mm or more, and more preferably 5 mm or more in terms of forming the second pattern. The expansion ratio $\alpha$ in the circumferential direction after the second pattern 12 is formed by blow molding is preferably 200% or more and 400% or less. The length a of the second pattern 12 in the preform in the circumferential direction is preferably 0.1 mm or more and 22.0 mm or less. The length L in the width direction of the surface of the blow-molded resin container on which the second pattern 12 is formed is preferably 40 mm or more and 80 mm or less.

As described above, the embodiments of the present invention have been described in detail, but the embodiments of the present invention is not limited thereto. Various modifications may be made without departing from the scope of the present invention.

Aspects of the present invention are as follows, for example.

In a first aspect, a resin container manufacturing method includes: forming a first pattern on a preform of a resin container; and forming a second pattern on the preform based on the first pattern In a second aspect, the resin container manufacturing method according to the first aspect, the forming the first pattern and the forming the second pattern are an identical process.

In a third aspect, the resin container manufacturing method according to the first aspect or the second aspect, a region in which the first pattern is formed on the preform is in the vicinity of an opening through which air is blown into the preform.

In a fourth aspect, the resin container manufacturing method according to any one of the first aspect to the third aspect, the region on which the first pattern is formed is a non-deformation region in blow molding of the preform.

In a fifth aspect, the resin container manufacturing method according to any one of the first aspect to the fourth aspect, the second pattern includes at least one of a character, an image, or a figure.

In a sixth aspect, the resin container manufacturing method according to any one of the first aspect to the fifth aspect, the first pattern is formed by laser marking.

In a seventh aspect, the resin container manufacturing method according to any one of the first aspect to the sixth aspect, the second pattern is formed by laser marking.

In an eighth aspect, the resin container manufacturing method according to any one of the first aspect to the seventh aspect, a position of a circumferential direction of the preform with respect to a mold in blow molding.

In a ninth aspect, the resin container manufacturing method according to any one of the first aspect to the eighth aspect, the preform is molded into a resin container having a body of a non-cylindrical shape having multiple surfaces in a cross section by blow molding, and the second pattern is formed at least one surface among the multiple surfaces.

In a tenth aspect, the resin container manufacturing method according to any one of the first aspect to the ninth aspect, the preform is molded into a resin container having a body of a non-cylindrical shape having multiple surfaces in a cross section by blow molding, the second pattern is formed at least one surface of the multiple surfaces, and an expression below is satisfied:

$$L-[(a\times\alpha)+(b\times 2)]\geq 0,$$

where a is length [mm] in a circumferential direction of the second pattern formed on the preform, α is an expansion ration [%] in the circumferential direction after blow molding of the second pattern. L is a length [mm] of a width direction of a surface of the resin container in which the second pattern is formed after blow molding, and b is a distance [mm] between an outer peripheral portion of the second pattern and an edge of a closest surface.

In an eleventh aspect, a resin container manufacturing method includes: forming a second pattern in a preform below blow molding; and forming a first pattern on the preform based on the first pattern.

In a twelfth aspect, a resin container manufacturing apparatus includes: a first device configured to form a first pattern in a preform before blow molding; and a second device configured to form a second pattern on the preform based on the first pattern.

In a thirteenth aspect, a resin container manufacturing apparatus according to the twelfth aspect, the first pattern forming device and the second pattern forming device are an identical device.

In a fourteenth aspect, the resin container manufacturing apparatus according to the twelfth aspect or the thirteenth aspect, a region in which the first pattern is formed on the preform is in the vicinity of an opening through which air is blown into the preform.

In a fifteenth aspect, the resin container manufacturing apparatus according to any one of the twelfth aspect to the fourteenth aspect, the region on which the first pattern is formed is a non-deformation region in blow molding of the preform.

In a sixteenth aspect, the resin container manufacturing apparatus according to any one of the twelfth aspect to the fifteenth aspect, the second pattern includes at least one of a character, an image, or a figure.

In a seventeenth aspect, the resin container manufacturing apparatus according to any one of the twelfth aspect to the sixteenth aspect, the first pattern is formed by laser marking.

In an eighteenth aspect, the resin container manufacturing apparatus according to any one of the twelfth aspect to the seventeenth aspect, the second pattern is formed by laser marking.

In a nineteenth aspect, the resin container manufacturing apparatus according to any one of the twelfth aspect to the seventeenth aspect, a position of a circumferential direction of the preform with respect to a mold in blow molding.

In a twentieth aspect, the resin container manufacturing apparatus according to any one of the twelfth aspect to the seventeenth aspect, the preform is molded into a resin container having a body of a non-cylindrical shape having multiple surfaces in a cross section by blow molding, and the second pattern is formed at least one surface among the multiple surfaces.

In a twenty-first aspect, a resin container manufacturing apparatus includes: a second pattern forming device to form a second pattern in a preform below blow molding; and a first pattern forming device to form a first pattern on the preform based on the second pattern.

In a twenty-second aspect, the resin container manufacturing apparatus according to any one of the eleventh aspect to the nineteenth aspect, the preform is molded into a resin container having a body of a non-cylindrical shape having multiple surfaces in a cross section by blow molding, the second pattern is formed at least one surface of the multiple surfaces, and an expression below is satisfied:

$$L-[(a\times\alpha)+(b\times2)]\geq 0,$$

where a is length [mm] in a circumferential direction of the second pattern formed in the preform, α is an expansion ration [%] in the circumferential direction after blow molding of the second pattern, L is a length [mm] of a width direction of a surface of the resin container in which the second pattern is formed after blow molding, and b is a distance [mm] between an outer peripheral portion of the second pattern and an edge of a closest surface.

In a twenty-third aspect, a resin container manufacturing method includes: forming a first pattern on a preform of a resin container; and forming a second pattern on the preform based on a position of the first pattern on the preform.

In a twenty-fourth aspect, in the resin container manufacturing method according to the twenty-third aspect, the forming the first pattern and the forming the second pattern are performed in an identical process.

In a twenty-fifth aspect, the resin container manufacturing method according to the twenty-third aspect or the twenty-fourth aspect, further includes: blowing air into the preform on which the first pattern and the second pattern are formed to form the resin container. The forming the first pattern forms the first pattern in a first region in a vicinity of an opening of the preform, and the blowing blows the air into the preform through the opening.

In a twenty-sixth aspect, in the resin container manufacturing method according to the twenty-third aspect or the twenty-fourth aspect, further includes: blowing air into the preform on which the first pattern and the second pattern are formed to form the resin container, the forming the first pattern forms the first pattern in the first region of the preform, and an amount of deformation of the first region by the blowing is smaller than an amount of deformation in a second region other than the first region of the preform by the blowing.

In a twenty-seventh aspect, in the resin container manufacturing method according to the twenty-third aspect or the twenty-fourth aspect, the second pattern includes at least one of a character, an image, or a figure.

In a twenty-eighth aspect, in the resin container manufacturing method according to the twenty-third aspect or the twenty-fourth aspect, the forming the first pattern forms the first pattern by laser marking.

In a twenty-ninth aspect, in the resin container manufacturing method according to the twenty-third aspect or the twenty-fourth aspect, the forming the second pattern forms the second pattern by laser marking.

In a thirtieth aspect, in the resin container manufacturing method according to the twenty-third aspect or the twenty-fourth aspect, further includes: determining the position of the first pattern in a circumferential direction of the preform; and determining a position of the preform in a mold in the circumferential direction based on the position of the first pattern, blowing air into the preform in the mold to form the resin container, the first pattern and the second pattern formed on the preform.

In a thirty-first aspect, the resin container manufacturing method according to the twenty-third aspect or the twenty-fourth aspect, further includes: blowing air into the preform on which the first pattern and the second pattern are formed to form the resin container having a noncircular cross-sectional shape having multiple surfaces, and the forming the second pattern forms the second pattern on at least one surface among the multiple surfaces.

In a thirty-second aspect, in the resin container manufacturing method according to the thirty-first aspect, the preform has a cylindrical shape, and an expression below is satisfied:

$$L-[(a\times\alpha)+(b\times2)]\geq0,$$

where a is a length [mm] of the second pattern in a circumferential direction of the preform, $\alpha$ is an expansion ratio [%] of the second pattern in the circumferential direction after the blowing. L is a length [mm] in a width direction of one of the multiple surfaces of the resin container after the blowing, and b is a distance [mm] between an outer peripheral end of the second pattern and one end of the one of the multiple surfaces closest to the outer peripheral end in the width direction.

In a thirty-third aspect, a resin container manufacturing method includes: forming a second pattern on a preform of a resin container; and forming a first pattern on the preform based on a position of the second pattern on the preform.

In a thirty-fourth aspect, a resin container manufacturing apparatus includes: a first pattern forming device to form a first pattern on a preform of a resin container; and a second pattern forming device to form a second pattern on the preform based on a position of the first pattern on the preform.

In a thirty-fifth aspect, in the resin container manufacturing apparatus according to the thirty-fourth aspect, the first pattern forming device and the second pattern forming device are an identical device.

In a thirty-sixth aspect, the resin container manufacturing apparatus according to the thirty-fourth aspect or the thirty-fifth aspect, further includes: a blow molding device to blow air into the preform on which the first pattern and the second pattern are formed to form the resin container. The first pattern forming device forms the first pattern in a first region in a vicinity of an opening of the preform, and the blow molding device blows air into the preform through the opening.

In a thirty-seventh aspect, in the resin container manufacturing apparatus according to any one of the thirty-fourth aspect to the thirty-sixth aspect, further includes: a blow molding device to blow air into the preform on which the first pattern and the second pattern are formed to form the resin container. The first pattern forming device forms the forming the first pattern forms the first pattern in the first region of the preform, and an amount of deformation of the first region by the blow molding device is smaller than an amount of deformation in a second region other than the first region of the preform by the blow molding device.

In a thirty-eighth aspect, in the resin container manufacturing apparatus according to any one of the thirty-fourth aspect to the thirty-seventh aspect, the second pattern includes at least one of a character, an image, or a figure.

In a thirty-ninth aspect, in the resin container manufacturing apparatus according to any one of the thirty-fourth aspect to the thirty-eighth aspect, the first pattern forming device is a laser marking device.

In a fortieth aspect, in the resin container manufacturing apparatus according to any one of the thirty-fourth aspect to the thirty-ninth aspect, the second pattern forming device is a laser marking device.

In a forty-first aspect, in the resin container manufacturing apparatus according to any one of the thirty-fourth aspect to the fortieth aspect, further includes: a position determining device to determine the position of the first pattern in a circumferential direction of the preform and a position of the preform in a mold in the circumferential direction based on the position of the first pattern, and the blow molding device to blow air into the preform in the mold to form the resin container on which the first pattern and the second pattern formed.

In a forty second aspect, the resin container manufacturing apparatus according to any one of the thirty-fourth aspect to the forty-first aspect, further includes: the blow molding device to blow air into the preform on which the first pattern and the second pattern are formed to form the resin container having a noncircular cross-sectional shape having multiple surfaces. The second pattern forming devices forms the second pattern at least on one surface among the multiple surfaces.

In a forty-third aspect, in the resin container manufacturing apparatus according to any one of the thirty-fourth aspect to the forty-second aspect, the preform has a cylindrical shape, and an expression below is satisfied:

$$L-[(a\times\alpha)+(b\times2)]\geq0,$$

where a is a length [mm] of the second pattern in a circumferential direction of the preform, $\alpha$ is an expansion ratio [%] of the second pattern in the circumferential direction after the blowing. L is a length [mm] in a width direction of one of the multiple surfaces of the resin container after the blowing, and b is a distance [mm] between an outer peripheral end of the second pattern and one end of the one of the multiple surfaces closest to the outer peripheral end in the width direction.

According to the resin container manufacturing method according to any one of the first aspect to the eleventh aspect and the resin container manufacturing apparatus according to any one of the twelfth aspect to the twenty-second aspect, the visibility of the resin container is increased, and the aim of the present invention can be achieved.

According to the resin container manufacturing method according to any one of the twenty-third aspect to the thirty-third aspect and the resin container manufacturing apparatus according to any one of the thirty-fourth aspect to the forty-third aspect, the visibility of the resin container is increased, and the aim of the present invention can be achieved.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A resin container manufacturing method comprising:
   forming a first pattern on a preform of a resin container, the first pattern being a laser marking located at or on threads of a threaded region;
   determining a position of the first pattern in a circumferential direction of the preform after forming the first pattern;
   determining a position of the preform in a mold in the circumferential direction based on the position of the first pattern;
   forming, after determining the position of the preform in the mold, a second pattern on the preform based on the position of the first pattern on the preform which has been determined; and
   blowing air into the preform in the mold, after the second pattern is formed, to form the resin container.

2. The resin container manufacturing method according to the claim 1, wherein:
   the forming the first pattern and the forming the second pattern are performed using an identical process.

3. The resin container manufacturing method according to claim 1, wherein:
   the forming the first pattern forms the first pattern at a threaded region of the preform, and
   the blowing blows the air into the preform through an opening of the preform.

4. The resin container manufacturing method according to claim 1, wherein:
   the forming the first pattern forms the first pattern in a first region of the preform, and
   an amount of deformation of the first region by the blowing is smaller than an amount of deformation in a second region other than the first region of the preform by the blowing.

5. The resin container manufacturing method according to claim 1, wherein:
   the second pattern includes at least one of a character, an image, or a figure.

6. The resin container manufacturing method according to claim 1, wherein:
   the forming the second pattern forms the second pattern by laser marking.

7. The resin container manufacturing method according to claim 1, wherein:
   the blowing of the air into the preform forms the resin container to have a noncircular cross-sectional shape having multiple surfaces, and
   the forming the second pattern forms the second pattern on at least one surface among the multiple surfaces.

8. The resin container manufacturing method according to claim 7, wherein:
   the preform has a cylindrical shape, and
   an expression below is satisfied:
   $$L-[(a \times \alpha)+(b \times 2)] \geq 0,$$
   where a is a length [mm] of the second pattern in the circumferential direction of the preform,
   α is an expansion ratio [%] of the second pattern in the circumferential direction after the blowing,
   L is a length [mm] in a width direction of one of the multiple surfaces of the resin container after the blowing, and
   b is a distance [mm] between an outer peripheral end of the second pattern and one end of the one of the multiple surfaces closest to the outer peripheral end in the width direction.

9. The method of claim 1, wherein:
   the first pattern is a longitudinal line.

10. The method of claim 1, wherein:
    the first pattern is formed on a flat portion of a neck of the preform within the threaded region.

11. The method of claim 1, wherein:
    the first pattern is formed on a neck ring of the preform.

12. The method of claim 1, wherein:
    the first pattern is formed on a support ring of the preform.

13. The method of claim 1, wherein:
    the laser marking of the first pattern changes a property of a base material of the preform.

14. The method of claim 13, wherein:
    the property is selected from the group consisting of evaporation of the base material, melting of the base material, a crystallized state of the base material, and a foamed state of the base material.

15. The method of claim 1, wherein:
    the laser marking is performed by a pulse laser.

16. The method of claim 1, further comprising:
    collecting dust and plume generated during the forming of the first pattern by laser marking.

17. The method of claim 1, wherein:
    the determining the position of the first pattern is performed by an optical device comprising a light emitting element and a light receiving element.

18. The method of claim 1, wherein:
    the preform comprises polyethylene terephthalate (PET).

19. The method of claim 1, wherein:
    the first pattern has a size in a range of 0.1 mm to 200 mm.

20. The method of claim 1, wherein:
    the second pattern has a size in a range of 1 mm to 200 mm.

* * * * *